(12) United States Patent
Loforte et al.

(10) Patent No.: US 12,079,569 B2
(45) Date of Patent: Sep. 3, 2024

(54) DOCUMENT EDITING MODELS AND LOCALIZED CONTENT MANAGEMENT

(71) Applicant: MICROSOFT TECHNOLOGY LICENSING, LLC, Redmond, WA (US)

(72) Inventors: Peter Eric Loforte, Issaquah, WA (US); Raymond Robert Ringhiser, Maple Valley, WA (US); Katharine Elizabeth Grant, Seattle, WA (US); Kapil Kumar Tundwal, Kirkland, WA (US); Paul Fraedrich Estes, Bellevue, WA (US); Veronica G. Sievers, Redmond, WA (US); Adam Dewayne Miller, North Bend, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 358 days.

(21) Appl. No.: 16/435,069

(22) Filed: Jun. 7, 2019

(65) Prior Publication Data
US 2020/0387567 A1    Dec. 10, 2020

(51) Int. Cl.
*G06F 40/197* (2020.01)
*G06F 16/31* (2019.01)
*G06F 16/93* (2019.01)
*G06F 40/166* (2020.01)

(52) U.S. Cl.
CPC .......... *G06F 40/197* (2020.01); *G06F 16/313* (2019.01); *G06F 16/93* (2019.01); *G06F 40/166* (2020.01)

(58) Field of Classification Search
CPC ....... G06F 40/197; G06F 16/93; G06F 40/166
USPC ........................................................ 715/229
See application file for complete search history.

(56) References Cited

U.S. PATENT DOCUMENTS

| | | |
|---|---|---|
| 6,345,243 B1 | 2/2002 | Clark |
| 6,526,426 B1 | 2/2003 | Lakritz et al. |
| 6,993,568 B1 | 1/2006 | Hauduc et al. |
| 7,207,005 B2 * | 4/2007 | Lakritz ................... G06F 40/58 715/201 |
| 7,392,243 B2 | 6/2008 | Brown et al. |
| 7,437,406 B2 | 10/2008 | Hauduc et al. |
| 8,122,367 B2 | 2/2012 | Krieger et al. |
| 8,660,978 B2 | 2/2014 | Hinckley et al. |
| 8,731,901 B2 | 5/2014 | Srihari et al. |
| 8,789,015 B2 | 7/2014 | Lerum et al. |
| 9,465,504 B1 * | 10/2016 | Jurgens ................... G06F 3/048 |

(Continued)

OTHER PUBLICATIONS

"International Search Report and Written Opinion Issued in PCT Application No. PCT/US2020/030168", Mailed Date: Aug. 10, 2020, 12 Pages.

*Primary Examiner* — Stephen S Hong
*Assistant Examiner* — Tionna M Burke
(74) *Attorney, Agent, or Firm* — NovoTechIP International PLLC

(57) ABSTRACT

A system and model by which to manage edits to localized versions of base-language electronic content. The model determines the likelihood of whether a modification made to a document is substantive and should be propagated back to the base electronic content and assists users in identifying these edits. The proposed method can significantly improve workflow efficiency and allow users to feel more comfortable in the development and use of their electronic content across multiple authoring platforms.

19 Claims, 14 Drawing Sheets

(56) References Cited

U.S. PATENT DOCUMENTS

| | | |
|---|---|---|
| 9,817,805 B1 | 11/2017 | Markman et al. |
| 9,942,333 B2 | 4/2018 | Ongg et al. |
| 2002/0103632 A1 | 8/2002 | Dutta et al. |
| 2007/0233456 A1 | 10/2007 | Kim et al. |
| 2008/0281804 A1 | 11/2008 | Zhao et al. |
| 2008/0288239 A1 | 11/2008 | Bailey et al. |
| 2009/0217196 A1 | 8/2009 | Neff et al. |
| 2012/0117463 A1 | 5/2012 | Inglis |
| 2012/0177291 A1* | 7/2012 | Gronau .................. G06V 10/98 382/218 |
| 2013/0007598 A1 | 1/2013 | Draper et al. |
| 2013/0275884 A1* | 10/2013 | Katragadda ............. H04L 67/52 715/753 |
| 2013/0346346 A1 | 12/2013 | Criminisi et al. |
| 2014/0006004 A1 | 1/2014 | Gundepuneni et al. |
| 2014/0122381 A1 | 5/2014 | Nowozin |
| 2014/0172753 A1 | 6/2014 | Nowozin et al. |
| 2014/0379657 A1* | 12/2014 | Avery .................. G06Q 10/101 707/638 |
| 2015/0052427 A1 | 2/2015 | Gunn et al. |
| 2015/0248764 A1 | 9/2015 | Keskin et al. |
| 2015/0248765 A1 | 9/2015 | Criminisi et al. |
| 2017/0132496 A1 | 5/2017 | Shoaib et al. |
| 2017/0206431 A1 | 7/2017 | Sun et al. |
| 2017/0236286 A1 | 8/2017 | Fanello et al. |
| 2017/0262768 A1 | 9/2017 | Nowozin et al. |
| 2018/0285326 A1* | 10/2018 | Goyal .................. G06F 40/166 |
| 2019/0220698 A1 | 7/2019 | Pradeep |

\* cited by examiner

| Feature | Description |
|---|---|
| Amount added | Number of words added |
| Amount deleted | Number of words deleted |
| Amount changed | Number or proportion of words changed relative to content as a whole |
| Stylistic elements | Types of stylistic writing devices used |
| Grammatical elements | Punctuation, capitalization, and spelling, as well as other mechanics of language |
| Media elements | Images, videos, slides, posters, presentations |
| Semantic attributes | Meaning and/or importance of words chaanged or added |
| Type of content | Web content, word document, spreadsheet, presentation, etc. |
| Readability score | Average length of sentences and words in the edit |
| Translation score | Translation confidence score for the edited portion |
| Relevance score | Relevance of edit to topic of original text |

FIG. 6A

| Feature | Description |
|---|---|
| Contributor characteristics | Number of previously submitted edits |
| | Assessment of user by topic owner |
| | Topics edited (which may signal expertise in those topics) |
| | Good edit(s) for same item |
| | Good edit(s) for same product/category/etc |
| | Contributor details |
| | Education |
| | Work experience |
| | Organization/Affiliation |
| | Social media tags |
| | Profile information |
| | Device location |

FIG. 6B

DOCUMENT EDITING MODELS AND LOCALIZED CONTENT MANAGEMENT

BACKGROUND

Electronic documents typically contain digital content such as text, images, and spreadsheets. During the drafting of a document, the content can be significantly revised over a period of time by multiple people. Some document-editing applications—such as certain word processors—permit revisions or changes to be made to the document by multiple users, storing them in a version of the file that constitutes the document.

It is common for a collaborative editing and review process to be used in the development and review of word processing documents. Collaborative document management processes are facilitated by the presence of communication networks to bring a wide variety of participants together to accomplish common goals. For example, many documents generated in today's electronic society are created by one or more individuals, and then further subject to review by several others. The documents to be reviewed are created as a form of electronic content that is forwarded to others for review and revision, or general template use, perhaps via an electronic network. In some cases, open authoring platforms allow users to share digital content and receive meaningful feedback and suggestions that can improve their own work.

Authors and reviewers participating in this shared process typically insert edits and comments to a version of the document that is available in their own native language. In many cases, this is the result of a translation (or localization) from the language in which the original version was drafted. The cloud-based applications supporting such shared documents are often configured to receive various changes that are made to the document and return those edits to the original version. However, in some cases, edits that are directed to an expression or grammar that is relevant only to the translated version of the document are of little value to the original version. Thus, there remain significant areas for new and improved ideas for facilitating propagation of substantive edits to a document, as well as providing users with tools for the management of such edits.

SUMMARY

A system for managing edits to localized versions of electronic content, in accord with a first aspect of this disclosure, includes a processor and machine-readable media including instructions which, when executed by the processor, cause the processor to determine that a first edit event has occurred during access of a first localized version of a first base electronic content, the first edit event including a first modification of a first portion of the first localized version by a first user. The instructions also cause the processor to generate a first score for the first edit event based on at least a first content characteristic of the first modification, and determine that the first modification has a high likelihood of being substantive based on at least the first score. Furthermore, the instructions cause the processor to initiate, in response to the determination that the first modification has a high likelihood of being substantive, an automated propagation of the first modification to at least the first base electronic content.

A method for managing edits to localized versions of electronic content, in accord with a second aspect of this disclosure, includes determining that a first edit event has occurred during access of a first localized version of a first base electronic content, where the first edit event includes a first modification of a first portion of the first localized version by a first user. The method also includes generating a first score for the first edit event based on at least a first content characteristic of the first modification, and determining that the first modification has a high likelihood of being substantive based on at least the first score. The method further includes initiating, in response to the determination that the first modification has a high likelihood of being substantive, an automated propagation of the first modification to at least the first base electronic content.

A system, in accord with a third aspect of this disclosure, includes means for determining that a first edit event has occurred during access of a first localized version of a first base electronic content, the first edit event including a first modification of a first portion of the first localized version by a first user, as well as means for generating a first score for the first edit event based on at least a first content characteristic of the first modification. The system also includes means for determining that the first modification has a high likelihood of being substantive based on at least the first score and means for initiating, in response to the determination that the first modification has a high likelihood of being substantive, an automated propagation of the first modification to at least the first base electronic content.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIGS. 6A and 6B present two tables listing some examples of data features for use by an edit management system;

DETAILED DESCRIPTION

Figure 1:
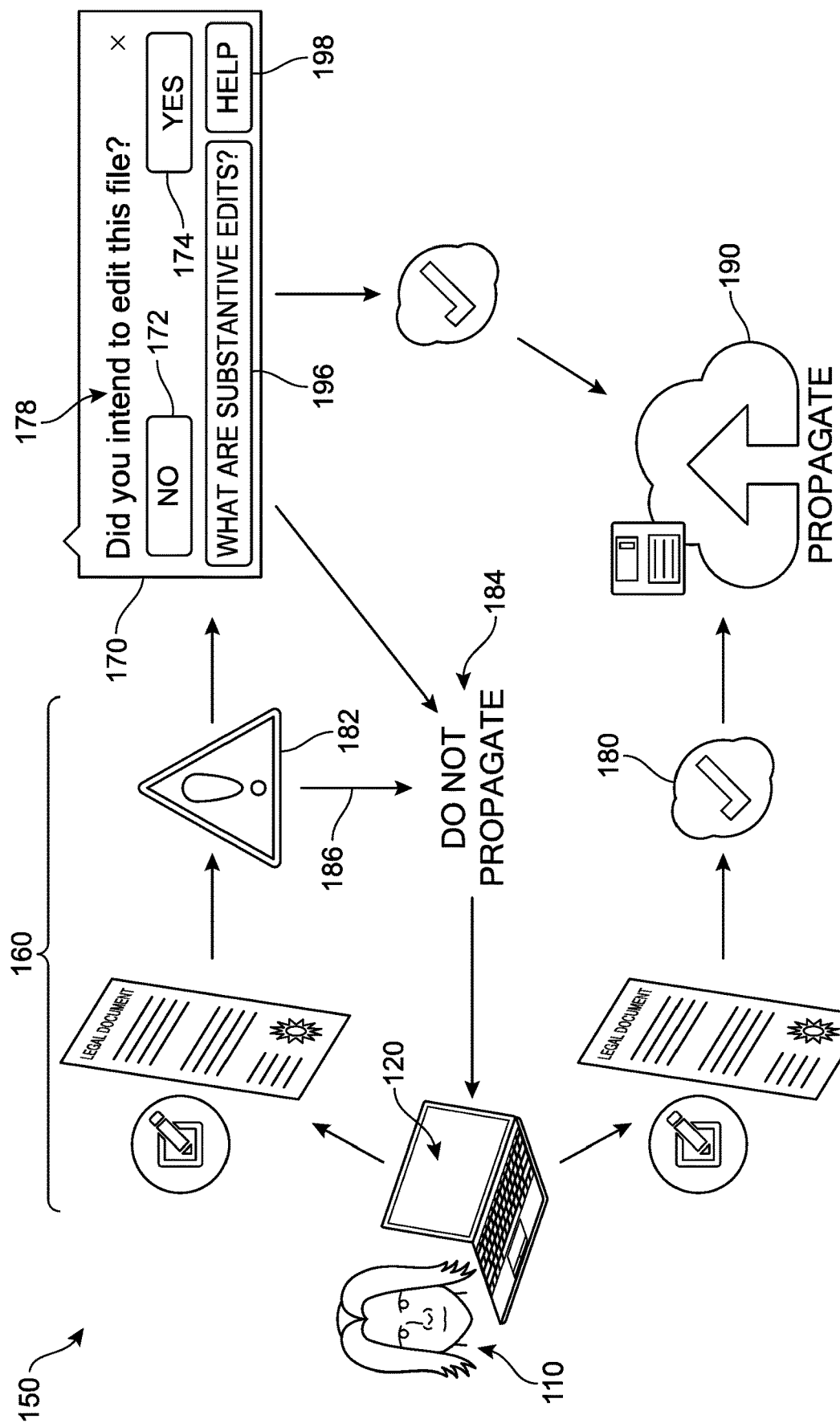
FIG. 1 is a conceptual diagram illustrating an implementation of an edit management environment.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

As users develop or review various types of electronic content, particularly during the drafting of larger documents and/or collaborative larger projects, a common challenge is determining whether to propagate changes that were made to localized versions of the document that differ from the base language in which the document was originally created. For example, an article may be written in the base language (such as English) and then sent out for translation into one or more target languages. If a contributor edits the localized version of the article (e.g., with a target language of Japanese), it can be important to the author to determine if those edits should propagate back to the original English (base language) version. For example, if the edits were "substantive edits" they should be propagated, and if they were specific to the Japanese version and are essentially "non-substantive edits" then they should not be applied to the original version. The following systems and methods are designed to assist users in managing edits or changes made to content that is shared across multiple localization platforms. In some implementations, a model determines the likelihood of whether a modification made to a localized digital content is substantive or non-substantive, optionally tags the edits according to that determination, automatically propagates edits that are deemed substantive, and can optionally guide authors in identifying these edits.

As introduced above, applications such as word processors, publishers, spreadsheets, presentations, and others can be used to generate electronic documents or content. In general, the term "electronic content" includes any digital data that may be presented (e.g., visually or audibly presented), including but not limited to an electronic document, a media stream, a web page, a hypertext document, an image, digital video or a video recording, digital audio or an audio recording, animation, a markup language document, such as a HyperText Markup Language (HTML) or eXtensible Markup Language (XML) document, a form having blank components to accept entered data, or data describing the application of a GUI, and other digital data. As an example, this electronic content may include word or other text-based documents.

The electronic content can be understood to include or be segmented into one or more portions that will be referred to as content elements. Thus, a "content element" can include any part of electronic content that is defined or discernable as a part. For example, a content element may be automatically discerned from a characteristic of the content element itself (e.g., a letter, number, word, sentence, paragraph, section, image, symbol, or chapter of an electronic document, or other file format designation) or may be manually defined by a reviewer (e.g., a reviewer-selected collection of words in an electronic document, a reviewer-selected portion of a digital image, a reviewer-selected slide from a presentation). Examples of content elements include portions or pieces of electronic text or other material within an electronic document, comments, dynamic content in the form of portions of media streams, such as sections of digital video or frames or sets of frames of digital video or digital audio, dynamic content in the form of segments or frames of animations, electronic forms, form templates, form elements, form data, actuatable element specifications or executable instructions, and various elements presentable or accessible by reviewers within electronic content, including instances of scripted and non-scripted dynamic content and the like.

In addition, an end-user may refer to an individual or entity who creates, edits, authors, views, develops, manages, reviews, revises, or deletes pieces of electronic content, including the creation or updating of comments associated with the electronic content. An end-user includes a user of application programs, as well as the apparatus and systems described herein. Furthermore, for purpose of this description, the term "software application", "software", or "application" refers to a computer program that performs useful work, generally unrelated to the computer itself. Some non-limiting examples of software applications include word processors, spreadsheets, accounting systems, and telecommunication programs, as well as gaming software, utility and productivity tools, mobile applications, presentation graphics, and other productivity software.

In different implementations, software applications such as programs offered in the Microsoft Office Suite® (e.g., Word®, Powerpoint®, Excel®) and other applications provide revising, editing, commenting and annotating tools. For example, Microsoft Word® offers users tools such as Comments, Highlight, Underline and other formatting options, Track Changes, Compare, among others, to add comments or make changes to a document. In other applications such as Google Docs® a "Suggestion Mode" may be used to suggest modifications or provide feedback for a document. These are non-limiting examples, and any other electronic content editing or collaboration application may benefit from the disclosed implementations. Specific references to a software application by name throughout this description should not therefore be understood to limit the use of the proposed systems and methods.

Once a change is made to a shared document, the document may present the changes in a substantially real-time manner to other users. Such 'instantaneous' updates can be used to facilitate collaborative workflows. For purposes of this description, data or documents being developed collaboratively include any activity in which multiple machines operate together autonomously, or as directed by humans, to process information, including electronic content. Processing the information may include the activities of acquiring the information, augmenting the information (e.g., via the addition of meta-data, such as comments), sorting the information, changing the information, deleting the information, rendering the information, aggregating the information from multiple sources, transforming the information from one form to another, and deriving new information from previously-existing information. One example of a collaborative process is the cooperation of multiple end-user to view, comment on, and make changes to a localized document or to prepare a translated document for localization.

As a general matter, the term localization of electronic content is distinguishable from translation, and in fact can be understood to encompass the process of translation into a different language. While translation is the process of changing an original (source) language version of electronic content such as text, multimedia, e-books, apps, etc. into a different (target) language by simply substituting words from one language to another, localization refers to the more specialized process of adapting the electronic content and applications for regional (or local) consumption. Thus, localization usually requires a step beyond translation, also seeking to modify the source language and other presentation or communication elements to appeal to the target user's cultural preferences in their own target language. When feedback or changes are received that target localized version(s) of electronic content, the original author and content can benefit immensely from a system facilitating an easy and reliable classification of such edits and, in some cases, a system that is configured to direct only substantive edits for (automatic) propagation back to the original version. An automated propagation process can translate the edit made to the localized version back to the base language and automatically apply that edit to the base language version of the file without the need for further user intervention, which can be of great benefit to document managers attempting to maintain an up-to-date electronic content repository.

Figure 4:
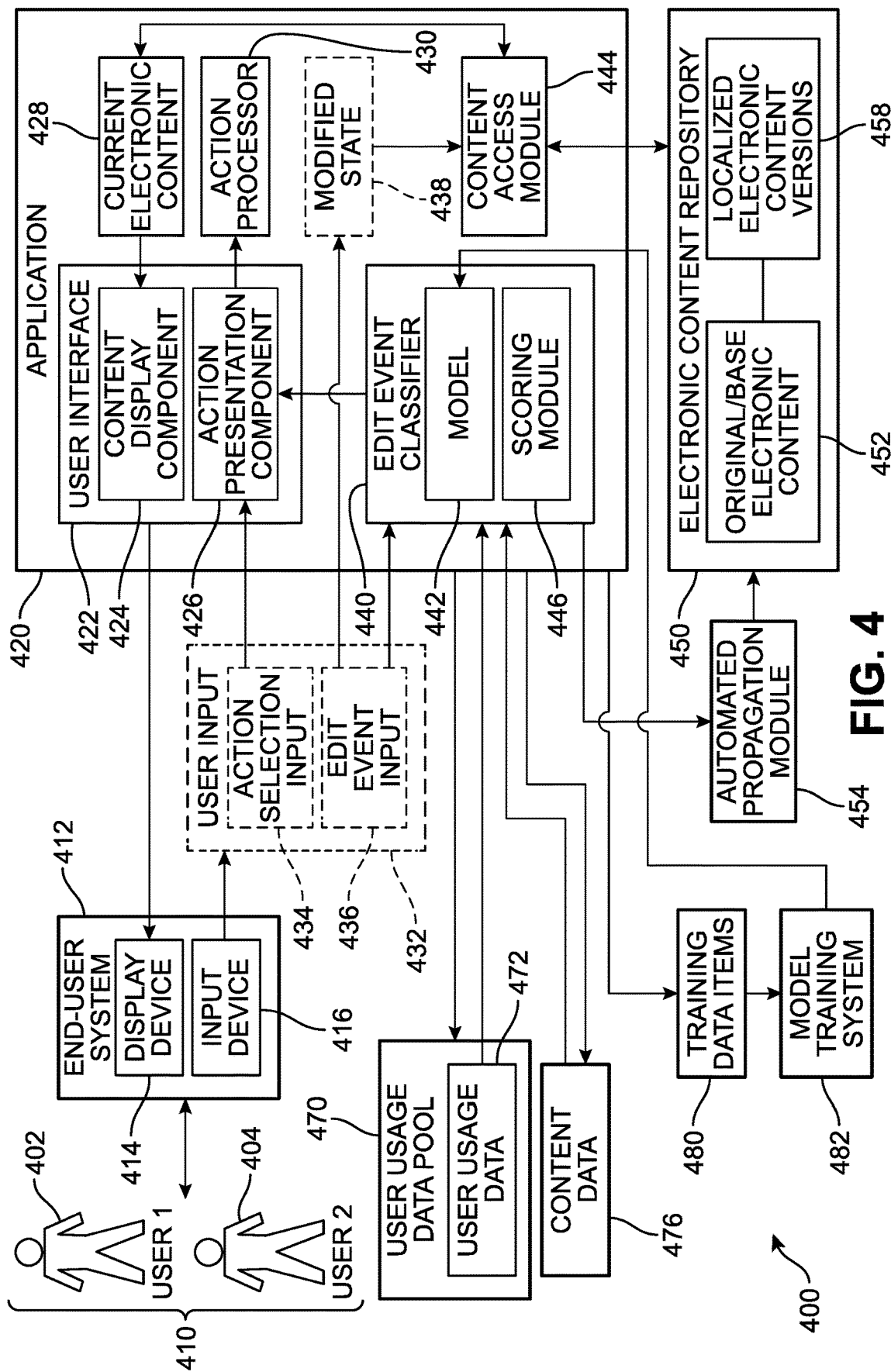
FIG. 4 is a conceptual diagram illustrating an implementation of a distributed computing environment for managing edits.

In order to better introduce the systems and methods to the reader, FIG. 1 presents a high-level example of a representative document editing environment ("environment") 150 for implementing an electronic content edit management system (illustrated schematically in FIG. 4). In different implementations, the environment 150 can include one or more computing device end-users, or simply "users". One or more users can interact with or manipulate data presented via a user device.

As an example, a first user 110 is shown in FIG. 1. In this case, the first user 110 is accessing a localized version of a document ("local document") 100 on a first device 120. It can be understood that the first device 120 is connected to a cloud-based computing service and/or storage ("cloud service") 190 via a network. As first user 110 works on a live document, various pieces or segments of the document may be modified or otherwise accessed at various times and across various devices and be updated or saved in the cloud service 190. In one implementation, multiple users can access the same document at the same time and make changes that are presented in real-time to other users. Thus, workflow may occur via multiple 'streams' that are configured to push data and pull data from a central repository or cloud network.

In this example, the first user 110 is reviewing a localized version of a document and, during the course of this review, has modified a portion of the local document. As will be discussed in further detail below, in some cases, the modification may be substantive (see a first path 140) or non-substantive (see a second path 160). In the case where the system detects one or more characteristics that are consistent or associated with a significant likelihood that the change was a substantive edit (represented by a first symbol 180), the system can be configured to automatically propagate the change to the original (base language) version. For example, in cases where the degree of confidence by a model in such a prediction is sufficient to trigger an automatic propagation of the edit. Thus, following the first path 140, the local document 100 can be edited and these edit(s) can be transmitted to a larger management service for all of the versions of electronic content, whether locally or on a network, such as cloud service 190. The edit can be translated from the target language to the base language and the change is made to the base language and then flows out to be translated, if needed, and published to each relevant language.

In other examples, the system may receive information suggesting the edit has a significant likelihood of being a non-substantive edit(s) to the local document 100. In such cases, as represented by a first aspect of a second path 160, the application can be configured to receive the edits and limit the effect of such changes to the present localized version (see transition 186 to a non-propagation stage 184). Furthermore, in cases where the system detects characteristics associated with the edit that together present a more ambiguous result (i.e., the edit may or may not be substantive), the application can be configured to present various options or notifications to the first user 110. Implementations of this process will be described in greater detail below. As one example, illustrated by the second path 160, the system can generate an alert (represented as a second symbol 182) that is associated with the document 100, and is presented to the first user 110. An example of such an alert is shown in FIG. 1 in the form of a native control 170. Generally, a "native control" refers to a mechanism for communicating content through a client application to an application user. For example, native controls may include pop-up windows that may be presented to a user via native application user interfaces (UIs), interactive buttons or other objects that may be shown to a user through native application UIs, as well as mechanisms that are native to a particular application for presenting associated content with those native controls.

The native control 170 in FIG. 1 is configured to offer the first user 110 information regarding its detection of the edit that was just made, and requesting that the editing user confirm whether the change to the document was substantive. In some implementations, the notification includes a query 178 with response options such as a first option 172 ("NO") and a second option 174 ("YES"). The query 178 in this case asks the first user 110 whether this was a substantive edit. In other words, the application can request confirmation of the type of edit that was made by the first user in order to determine whether the edit should be propagated. The user may respond to the query and thereby provide validation or feedback to the system by the selection of one of the two options. In some implementations, additional information and/or options may also be presented, such as a help option 196 and/or an additional explanation option 198 (to explain what edits would be classified as substantive versus non-substantive). It should be understood that a user may opt to not to respond at all and instead ignore or dismiss the native control 170 (for example, by closing or minimizing the window, or by ignoring the dialog window and continuing to work within the document).

If a user selects the first option 172 ("NO"), the application may be configured to tag the edited content accordingly and move to the non-propagation stage 184. In some implementations, if a user selects the second option 174 ("YES"), the system can classify the edit accordingly, and/or proceed with automatically propagating the edit and/or submitting a notification to the original author.

The proposed systems and methods are aimed to help minimize or prevent the propagation of non-substantive types of edits and/or reduce the burden on the content author in discriminating among the various edits made to localized versions. In some implementations, the application running the electronic content can be associated with machine learning algorithms (MLAs) to improve user experiences by increasing confidence in edit type classifications and guiding or assisting the users in the management of any changes. In order to provide further context for the uses and applications of the systems described herein, FIGS. 2 and 3 present two non-limiting examples of edits that were made to a localized version of electronic content.

Figure 2:
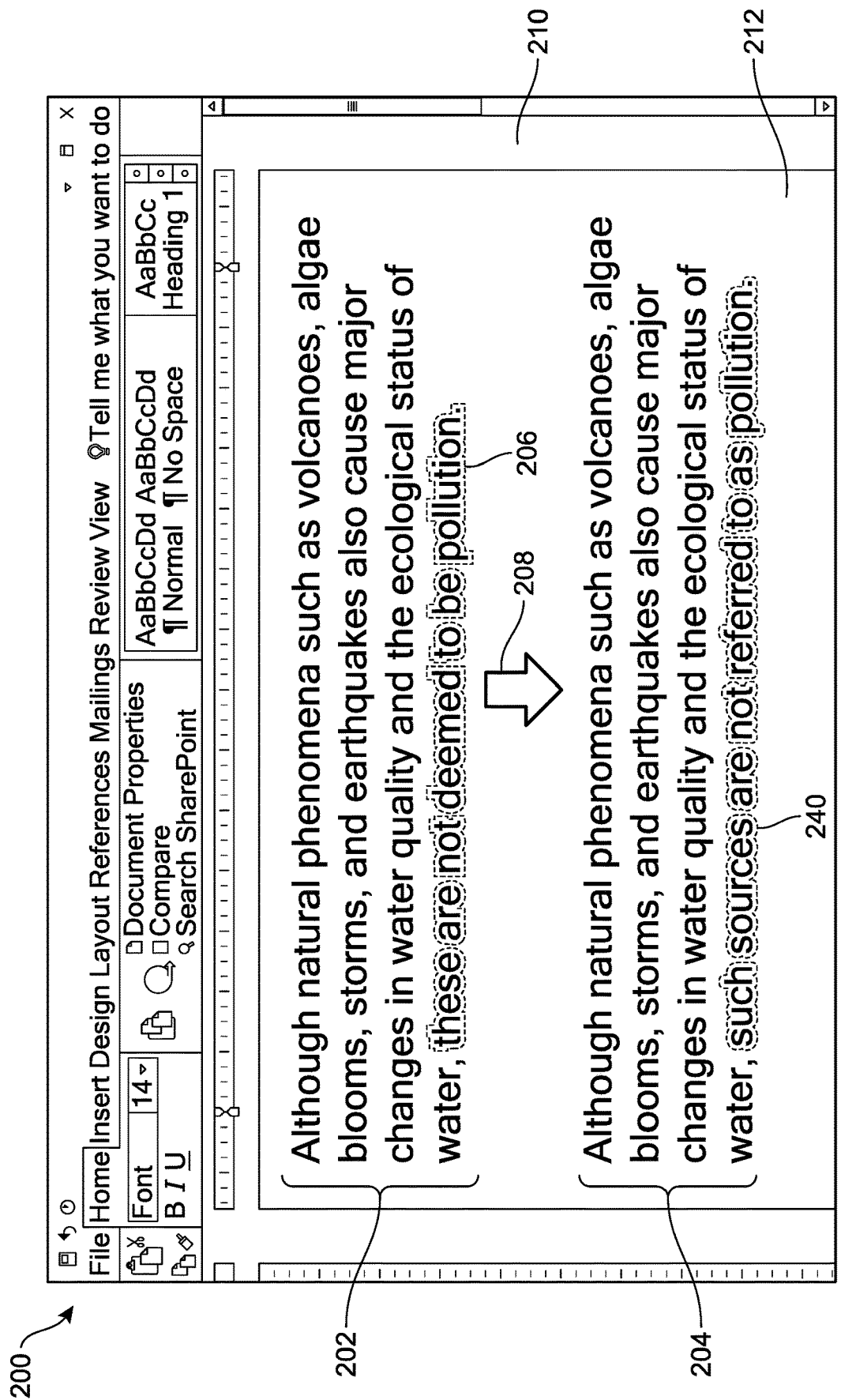
FIG. 2 is a display diagram illustrating an example of a non-substantive edit.
Figure 3:
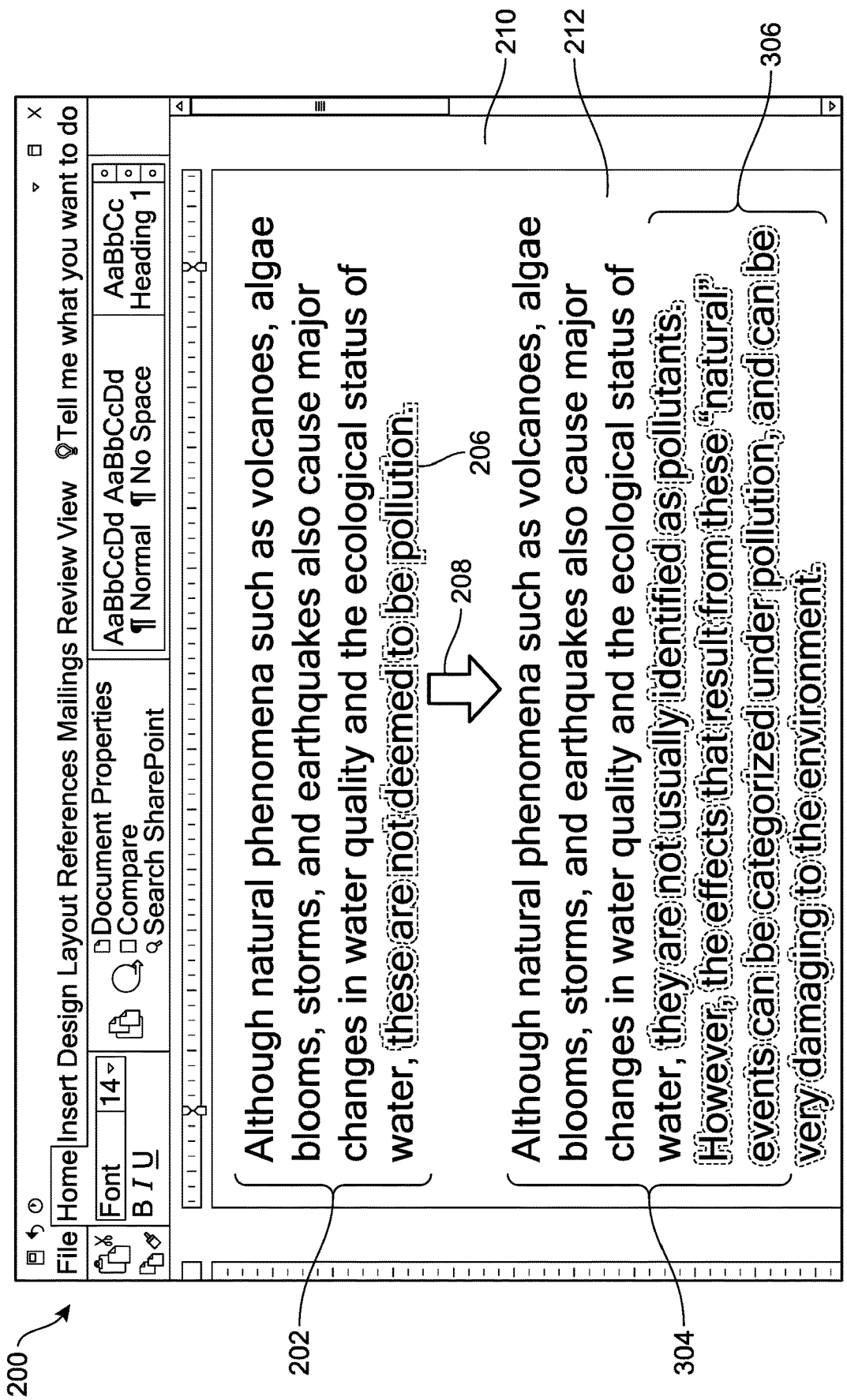
FIG. 3 is a display diagram illustrating an example of a substantive edit.

In FIGS. 2 and 3, an implementation of a display 200 for a computing device is illustrated. In different implementations, the display 200 may present various icons or graphical representation, interfaces, applications, or other device status information. As an example, the display 200 includes an interface for a first application 210. For purposes of simplicity, the first application 210 in FIG. 2 is a word processor program displaying a localized version of a document page ("document") 212. In one implementation, the first application 210 may be understood to represent a version of Microsoft Word®, or another word processing program, such as Apple Pages®, Corel WordPerfect®, Google Docs®, IBM Lotus Word Pro® and other word editing programs, as well as any web content open authoring platforms such as a web content management system (WCMS) configured to provide website authoring, collaboration, and/or administration tools that help users manage website content. For example, a WCMS provides the foundation for collaboration, providing users the ability to manage documents and output for multiple author editing and participation. Most such systems use a content repository or a database to store page content, metadata, and other information assets the system needs. However, in other implementations, the first application 210 may include any other software applications within the Microsoft Office Suite® or array of Microsoft® products as well as any non-Microsoft® based applications and other web content editing applications or services.

While only a single document is illustrated in FIG. 2, it should be understood that an arrow 208 extending between an initial localized content 202 and a first modified localized content 204 schematically represents a "before and after" type scenario. A user (such as a reviewer) may access the initial localized content 202 and, during review of the document 212, decide to modify a portion. While the reviewer modifies a first content element 206 (the specific portion of the initial localized content 202), the reviewer deletes some words and inserts other words, thereby replacing the selected portion of text with new text (see first modified localized content 204) in the local (target) language. Throughout this application, both the target and base language will be represented in the English language for purposes of convenience and readability to the reader. However, when references are made to a localized (target language) version and an original (base language) version, it should be understood that these two terms reflect two different languages translating the same electronic content for different audiences.

In this example, the reviewer has only modified a small set of words and it is clear that the intent was simply to clarify the expression in the target language. In other words, the meaning or actual substance of the sentence is unchanged. Thus, the document 212 includes the same general content as it did previously, with an improved localization factor, improving the readability for the target audience. However, such a change would not need to be propagated to the original language.

For purposes of comparison, in FIG. 3, the display 200 again includes an interface for first application 210, presenting a localized version of the document 212. Arrow 208 extending between initial localized content 202 and a second modified localized content 304 schematically represents another "before and after" type scenario. The reviewer may access the initial localized content 202 and, during review of the document 212, decide to modify the first content element 206, but in a manner that differs from FIG. 2. In this case, the reviewer deletes the first content element 206 and replaces not just the expression conveyed by those words but proceeds to add other words that expand, alter, or otherwise affect the substantive content of the first content element 206. As the text is changed to include a new portion 306 in the local (target) language, the system can detect particular characteristics associated with the change that signal a substantive edit, as further context and meaning is given to the original content. This type of edit can, in some implementations, be automatically propagated to the original version of the document and/or presented to the author for their review and approval.

Referring now to FIG. 4, an example of a representative architecture of a content edit management system ("system") 400 is depicted. In different implementations, the system 400 can be configured to present user interfaces for identifying and responding to edits to localized content. The system 400 can be further configured to present additional user interfaces. It can be understood that the system 400 presented here is merely an example implementation and that a wide variety of other implementations are possible.

In different implementations, the system 400 can include one or more end-user systems 412 (only one end-user system 412 is shown in FIG. 4) for use by a user 410, such as a first user 402 and a second user 404. The user can refer for example to an editing or contributing end-user, an authoring end-user, and/or a document manager end-user. The user 410 is making used of the end-user system 412. The end-user system 412 includes a display device 414 used in connection with an application 420 to display graphical elements generated by a user interface 422 to the user 410. The end-user system 412 also includes one or more input devices 416 used to receive commands or other input from the user 410, from which the end-user system 412 is configured to generate corresponding user input 432 for the application 420. Each of the users (such as the first user 402 and the second user 404) of the application 420 may be associated with different user identifiers, such as usernames and/or numbers.

The user interface 422 included in the application 420 generates various graphical user interfaces for viewing and editing a current electronic content 428. In some examples, the current electronic content 428 has been retrieved, using a content access module 444, from an electronic content repository 450; for example from a base electronic content 452 stored in the electronic content repository 450, or from corresponding localized versions of the electronic content 458 stored in the electronic content repository 450. The user interface 422 may be configured to generate the various user interfaces described throughout this application in connection with FIGS. 1-11, including but not limited to the menus, submenus, options, sub-options, indicators, dialog boxes, messages, e-mails, pop-up messages, dialog windows, and other input or presentation interfaces. The user interface 422 further includes a content display component 424 configured to cause portions of the current electronic document 428 to be presented on the display device 412.

As described in this disclosure, the user 410 (such as first user 402) may submit an input that causes an edit event input 436 to be generated, which indicates a modification has been made to the current electronic content 428. The state of the current electronic content 428 before the application receives the edit event input 436 may be referred to as an "initial" or "unmodified" state for the current electronic content 428. In response to receiving the edit event input 436, the application 420 determines a corresponding modified state 438 for the current electronic content 428. Also in response to receiving the edit event input 436, an edit event classifier 440 determines, based on at least user usage data 472 (which may be referred to as a "user usage profile", "recorded user usage" or "user usage history" or "user characteristics", see FIG. 6B) for the first user 402 and/or content data 476 ("content characteristics", see FIG. 6A) for or associated with the current electronic content 428 itself (including but not limited to metadata, structured data, and unstructured data), whether the input received from first user 402 was a substantive edit to the current electronic content 428. The user usage data 472 can also indicate use of the application 420, and possibly other applications, by the first user 402. In some examples, as illustrated in FIG. 4, the user usage data 472 is included in a user usage data pool 470 storing similar usage data for a larger number of users which can be fed into the model for further training. The application 420 may be configured to collect portions of the user usage pool data 470. In some examples, as illustrated in FIG. 4, the content usage data 476 is included in a content usage data pool 474 storing similar usage data for a larger number of users. The application 420 may be configured to collect portions of the content usage pool data 474.

In some implementations, the edit event classifier 440 includes, or otherwise makes use of, a machine-trained model 442 to determine if the modification was substantive. For example, training data items 480 may be generated based on previous user interactions with the application 420, previous responses to actions presented to contributors and/or document managers, portions of the user usage data pool 470, and/or portions of the content usage data pool 474, and other training data items 480 used by a model training system 482 to generate a new (or re-trained or reinforced) model 442 for use by the edit event classifier 440. In response to the edit event classifier 440 determining that the modified state 438 includes a substantive modification with a high degree of confidence, an automated propagation module 454 can be activated to trigger the propagation of the substantive edit to the base electronic content 452. In response to the edit event classifier 440 determining that the modified state 438 includes a non-substantive modification with a high degree of confidence, no further action may be taken regarding the present edit.

Furthermore, in some implementations, the edit event classifier 440 includes a scoring module 446 configured to review the received edit inputs, user and content characteristics, and model output and assign a score to the edit event. This score can be understood to represent a confidence level or degree of likelihood that the classification is substantive. A confidence threshold can be established either by the system or selected by the document manager, and if the score for the edit event is higher than the confidence threshold, the system can be configured to communicate with the automated propagation module 454 and initiate a propagation of the edit. In some cases, if the score is lower than the threshold but above a baseline threshold, the edit can be tagged as substantive but the system can then trigger presentation of a query to either or both of the first user or second user.

In response to the edit event classifier 440 determining that the modified state 438 includes an substantive modification with a low degree of confidence, or an otherwise ambiguous result or determination, an action presentation component 426 causes a user interface element to be presented to the first user 402 to confirm whether the modified state 438 includes a substantive modification. A response from the first user 402 is received as an action selection input 434; for example, an input indicating whether the first user 402 selected a first option to confirm that the modification was substantive or a second option that it was not. In response to the edit event classifier 440 determining that the modified state 438 includes an substantive modification with a low degree of confidence, or an otherwise ambiguous result or determination, an action presentation component 426 causes a user interface element to be presented to a document manager (such as the second user 404) to confirm whether the modified state 438 includes a substantive modification. A response from the second user 404 is received as action selection input 434; for example, an input indicating whether the second user 404 selected a first option to confirm that the modification was substantive or a second option that it was not. In some implementations, the second user 404 may also be able to submit an input that triggers the automatic propagation process. As will be discussed below, the system may also include a post-modification behavior assessment module (not shown) for cases in which no response is received from the first user 402 and/or the second user 404.

Figure 5:
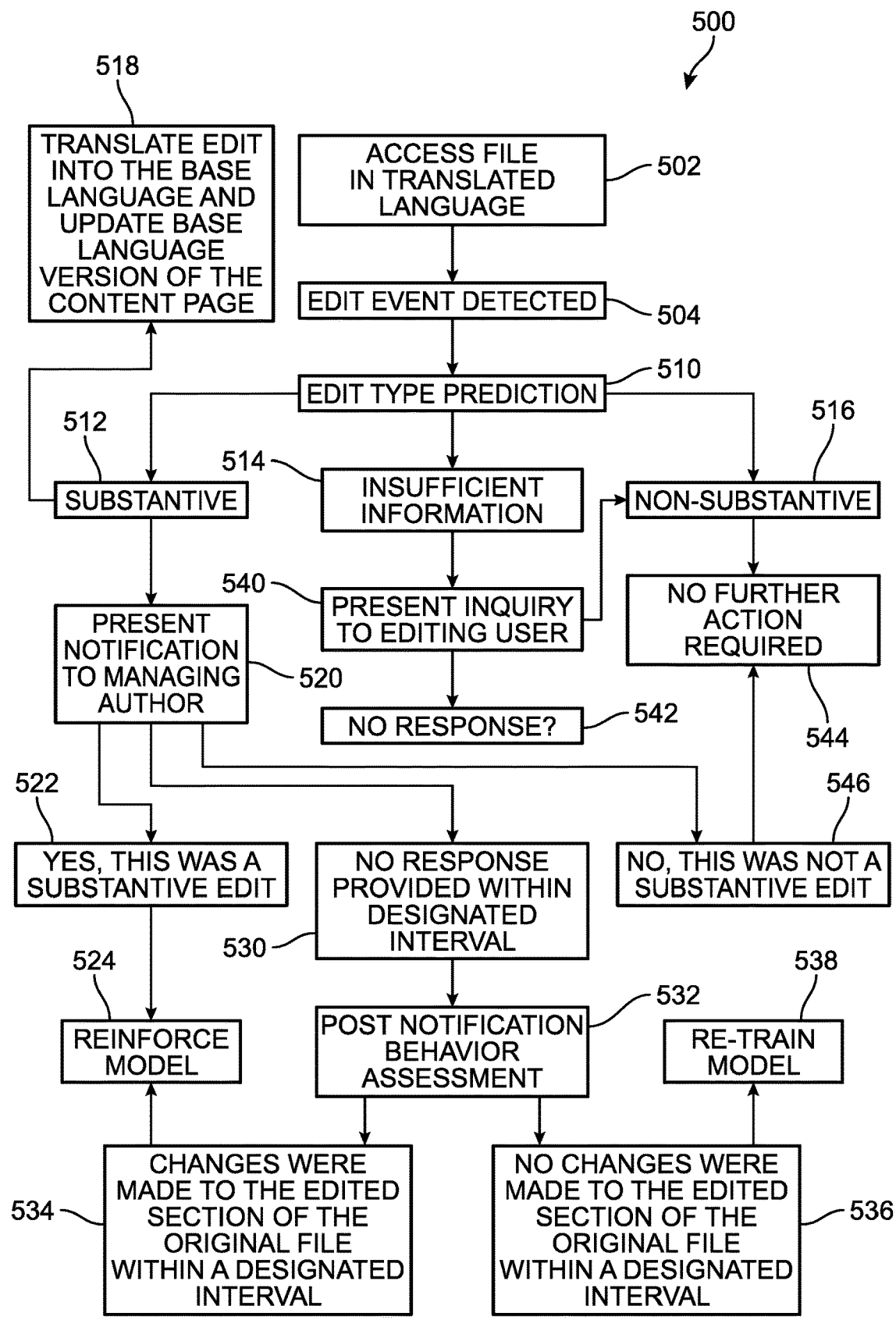
FIG. 5 is a flow diagram illustrating an example of implementing a model for determining an edit type.

For purpose of clarity, FIG. 5 presents a flow diagram illustrating an implementation of a method 500 of training and implementing an MLA for managing edits to electronic content. As touched upon earlier, in different implementations, the system can be trained using data generated by machine learning models in order to identify, determine, and/or assess the intent associated with an edit. Such data may be generated following the accumulation, review, and/or analysis of a large number of edit-related events or actions that may be configured to provide the MLA with an initial or ongoing training set, including recorded use or behavior of application features by different users over time (content usage history). As a general example, the number of events used to serve as a baseline can range from 100 to over 100,000. In addition, in some implementations, the user device can be configured to transmit data captured locally during use of the relevant application(s) to the cloud or the local ML program and provide supplemental training data that can serve to fine-tune or increase the effectiveness of the MLA. The supplemental data can also be used to facilitate identification of inadvertent edits for a particular (unique) user or class of users and/or to increase the training set for future application versions or updates to the current application.

In different implementations, a training system may be used that includes an initial ML model (which may be referred to as an "ML model training module") configured to generate a subsequent trained ML model from training data obtained from a training data repository or from device-generated data. The generation of this ML model may be referred to as "training" or "learning." The training system may include and/or have access to substantial computation resources for training, such as a cloud, including many computer server systems adapted for machine learning training. In some implementations, the ML model trainer is configured to automatically generate multiple different ML models from the same or similar training data for comparison. For example, different underlying ML algorithms may be trained, such as, but not limited to, decision trees, random decision forests, neural networks, deep learning (for example, convolutional neural networks), support vector machines, regression (for example, support vector regression, Bayesian linear regression, or Gaussian process regression). As another example, a size or complexity of a model may be varied between different ML models, such as a maximum depth for decision trees, or a number and/or size of hidden layers in a convolutional neural network. As another example, different training approaches may be used for training different ML models, such as, but not limited to, selection of training, validation, and test sets of training data, ordering and/or weighting of training data items, or numbers of training iterations. One or more of the resulting multiple trained ML models may be selected based on factors such as, but not limited to, accuracy, computational efficiency, and/or power efficiency. In some implementations, a single trained ML model may be produced.

In some implementations, the ML models and/or their corresponding classification systems can be configured to use, among other things, machine learning and inference techniques to identify and/or classify device events or user behavior based on data collected during use of the system. In some implementations, machine learning techniques may generate one or more models for identifying and/or characterizing events based on a corpus of training data in the form of labeled or otherwise previously characterized data. In some implementations, one or more portions of the training data may be provided via the device(s) itself. Furthermore, the training data may be continually updated and one or more of the models used by the classification system can be revised or regenerated to reflect the updates to the training data. Over time, the training system (whether stored remotely, locally, or both) can be configured to receive and accumulate more and more device-generated training data items from locally operated assistive devices and/or other training data collection devices, thereby increasing the amount and variety of training data available for ML model training, resulting in increased accuracy, effectiveness, and robustness of trained ML models.

Various ML algorithms and techniques for training ML models are discussed in U.S. Patent Application Publication Numbers 2013/0346346 (published on Dec. 26, 2013 and entitled "Semi-Supervised Random Decision Forests for Machine Learning"), 2014/0122381 (published on May 1, 2014 and entitled "Decision Tree Training in Machine Learning"), 2014/0172753 (published on Jun. 19, 2014 and entitled "Resource Allocation for Machine Learning"), 2015/0248764 (published on Sep. 3, 2015 and entitled "Depth Sensing Using an Infrared Camera"), 2015/0248765 (published on Sep. 3, 2015 and entitled "Depth Sensing Using an RGB Camera"), 2017/0132496 (published on May 11, 2017 and entitled "Hardware-Efficient Deep Convolutional Neural Networks"), 2017/0206431 (published on Jul. 20, 2017 and entitled "Object Detection and Classification in Images"), 2017/0236286 (published on Aug. 17, 2017 and entitled "Determining Depth from Structured Light Using Trained Classifiers"), U.S. patent application Ser. No. 15/870,783 (filed on Jan. 12, 2018 and entitled "Automated Collection of Machine Learning Data"), and 2017/0262768 (published on Sep. 14, 2017 and entitled "Depth from Time-of-Flight Using Machine Learning"), which are each incorporated by reference herein in their entireties.

Thus, in different implementations, a machine learning model can be developed that is configured to predict with high confidence, precision, and recall whether a user is likely to or is currently making an edit that should be propagated back to the original version of the file. The ML model can then provide a user experience that guides the user to recover the original content or pursue other edit management options if the model's prediction was correct. In some implementations, the ML model can obtain reinforcement signals to improve the model and better account for classifications regarding an edit. As a preliminary modeling paradigm, some implementations can make use of one or more bootstrapping algorithms to provide approximations of these predictions. For example, in one implementation, the model can assume all edits made to the localized version of the file are substantive as a proxy. In some implementations, the resulting (initial) model of this example can be configured to predict whether the edit should be propagated when an edit to a localized version with 80% or greater precision. In some implementations, if the model determines that the edit is non-substantive, no additional action need be taken, or a notification of the edit classification may be provided to the author for verification.

Furthermore, in different implementations, the initial model can serve as a baseline that facilitates the collection of additional and/or more relevant training data, permitting further development and improvement of the model. Generally, the stages of an edit can include opening or otherwise accessing electronic content, clicking or repositioning the location of the cursor (e.g., via a mouse) within the content, entering, deleting, or changing text or any other data in the electronic content, highlighting or selecting a portion of the electronic document, interacting with menu options associated with edits, and/or manipulating the data in any other manner. Each of these aspects can be divided and classified into discrete events that may be identified individually or collectively as a triggering event, which can in some implementations elicit the presentation of a native control, such as a graphical UI, or GUI.

In general, a "trigger event" or "triggering event" refers to an event (or specific sequence of events) associated with a particular use of an application, which is then used to trigger a response by the system. In some implementations, the triggering event may be understood to include a 'click' or other input actions (such as a mouse left-button or right-button click, a touchscreen tap, a selection of data, or other input types). However, in other implementations, a triggering event may occur in response to results from automated intelligent scans or searches of the document and its various content elements by the system (see FIG. 4). For example, the application can be configured to automatically search the electronic content periodically, substantially continuously, or at intervals determined by an end-user, and identify when an edit to a content element or an insertion or deletion is incongruous in the broader context of the document, and may therefore be inadvertent.

In some implementations, the system may be configured to identify these or other actions as corresponding to a usage type or a specific event. Thus, in one implementation, the system can be configured to determine, for example during use of an application, that a triggering event has occurred based on a detected occurrence of a particular set of editing characteristics and history and/or a type of edit associated with the electronic content itself (including but not limited to metadata, structured data, and unstructured data). In response to such a determination, the application may present or display a notification to either or both of the editing end-user and the author. It should be understood that in some implementations, the notification itself may include or serve as a native control, via which the user can select options or respond to system-generated queries (see for example FIGS. 7-10).

In different implementations, the system may also configured to ask or present a query to the editing end-user regarding whether an edit determined to be substantive (or non-substantive) was correctly identified. The feedback provided by the user can then reinforce or retrain the model. For example, if the user responds that the determination was correct, the model can be reinforced, and if the user responds that the determination was not correct, the model can be updated or retrained. Furthermore, it can be understood that there will be cases where users will ignore or dismiss any dialog windows or notifications, and no feedback will be provided. In this situation, the author's subsequent actions can nevertheless be informative for training the model. As an example, if the system predicts that an edit is substantive, and the author does not change the original version of the document (or undo's the automatically applied edit propagation to the original version), the system may either present a notification to the author, and ask if the edit was non-substantive, or may automatically retrain its model based on this more 'subtle' or indirect feedback. In other cases, if an author is asked to confirm if an edit was non-substantive, they may ignore or close the message without responding to the query, but then make changes to the original version corresponding to the identified edit in the localized version, immediately or soon after being shown the notification. Such behavior can indicate to the system that its determination was incorrect, which can be used to re-train the model. Alternatively, a user may continue without making changes to the original version, indicating that the determination was correct, and this information can be used to reinforce the model. Further examples of actions or events that can signal whether an edit is substantive will be discussed with reference to FIGS. 6A and 6B.

As described herein, in different implementations, the system can make use of an ML model that is configured to receive a plurality of inputs that can be used to auto-categorize target language user inputs (edits) and apply layers of "scoring" to such inputs. In some implementations, "back-translated contributions" (e.g., content translated from the modified target language back to the base language) can also be scored by the topic owner or document manager on various "dimensions", which can be fed back to model in order to better train the model and bolster the accuracy of the scoring. Once the ML model is performing well enough to automate the edit classification determinations, the model can be expanded to also trigger automated propagation. For example, an edit can be automatically incorporated into the original version when the automated scores about the submitted edit that is of sufficient magnitude. In some implementations, the edit must also be appropriately tagged (for example, specific to X language/Y languages/all languages), evaluated by tools such as Acrolinx™ or other platforms for content creation and/or content analysis, routed through needed term database and translation memories, and then may be published to all relevant languages. The automated scores generated for an edit determine whether the submitted change will be automatically applied to the base content and appropriately tagged (for example, specific to X language/Y languages/all languages). However, it is to be understood that a manual review by the document manager can also be requested before the edit is permitted to be published. Thus, these model generated automated scores can be used to determine whether the submitted change should be routed to the document manager for manual review and further determination and/or processing.

Referring now to the flow diagram of FIG. 5, it can be seen in one implementation that a first step 502 of this process 500 can include the access or opening of a localized (translated) version of an electronic content or file. If any changes are made to the file, an edit event can be detected in a second step 504, which may trigger or initiate an Edit Type Prediction mode in a third step 510. As described herein, the prediction can be based at least in part on a variety of structured and unstructured data (see FIGS. 4 and 6), including but not limited to usage characteristics of the current editing user, file history and metadata, and/or the characteristics of the edit itself.

In the third step 510, the model may determine the likelihood that an edit was substantive during the current user access session. In some cases, the model can generate a prediction that there is a significant likelihood the edit is non-substantive, as represented by a fourth step 516, tag the edit as such, and no further action will be required (fifth step 544) by the system. In other implementations, the system can be configured to nevertheless notify the authoring user (or document manager) of any changes, and/or can notify the authoring user only if the confidence value associated with the prediction is below a particular threshold (not depicted in FIG. 5).

Alternatively, the model can predict that the edit is substantive in a sixth step 512. In one implementation, this prediction can trigger an automated process 518 in which the edit is translated or propagated back into the base language and the base language (original) version of the file is updated accordingly, without the need for any further input from user(s). In some cases, this can occur only if the confidence value associated with the prediction is above a particular threshold and/or if the document manager has authorized such a process. In another example, the automated propagation may only occur if the edit itself passes a pre-specified readability threshold for the changed content (see FIG. 6A). In some implementations, the prediction can alternatively or also trigger presentation of a message to the document manager in a seventh step 520 (see FIG. 10). In some cases, the message can be configured as a query for the document manager requesting confirmation that the edit in question was indeed substantive. The document manager can in an eighth step 522 confirm the prediction, thereby providing data that can be used to reinforce the model in a ninth step 524. In cases where the document manager disagrees and identifies the edit as non-substantive in a tenth step 546, the data can instead be used to re-train the model in an eleventh step 538.

In some implementations, the document manager may for any reason fail to provide any response to the notification of seventh step 520, as represented by a twelfth step 530. In cases where the user makes no response or otherwise ignores the notification, the system can automatically collect or record data regarding user behavior subsequent to the notification in a thirteenth step 532. As one example, the user may manually proceed to make changes to the original version corresponding to the localized edit (a fourteenth step 534) where such a process did not occur automatically. In some implementations, there may be a designated or pre-set time interval following the receipt of the notification during which such a manual propagation must occur in order for such behavior to serve as a signal to the system that the user has confirmed the prediction. Such actions can indicate to the system that the model's prediction or assessment was correct and be used to reinforce the model (ninth step 524). If no manual propagation occurs within the designated timeframe (fifteenth step 536), the data can instead be used to re-train the model in the eleventh step 538. In cases where the system automatically propagated the edit, if the user retains the edit, this can serve as an indication that the edit was correctly classified as substantive, and the system can employ this information to reinforce the model (ninth step 524).

In other implementations, particularly during earlier stages of the model and its training and development, the model may attempt to make a prediction, but the edit characteristics and other aspects of the edit event may decrease the confidence of such an attempt (see sixteenth step 514). If the result remains ambiguous, the system may be configured to transmit a prompt or otherwise inquire from the editing user (see seventeenth step 540) what type of edit the editing user believes the edit to be. The editing user may decide the edit was substantive (see sixth step 512) or non-substantive (fourth step 516) and this information will be used to re-train the model. If however, the editing user makes no response or otherwise ignores the notification (see an eighteenth step 542), the system can shift the inquiry to the document manager, as represented by seventh step 520, and the process can move forward as described above.

As referenced herein, the term "automatically" or "automatic" are defined as not requiring user intervention, notification, or involvement. Thus, user assistance is not required for the process or task to occur. As another example, the term "automatic" refers to a function, a process, a method, or any part thereof, which is executed by computer software upon occurrence of an event or a condition without intervention by a user.

In different implementations, the features or specific data types harvested by the system to assess the type of edit can vary widely depending on characteristics of the editing user, the editing user account, the device, the editing application, the document type, the purpose of the document, how the document is being saved or accessed, the device location, or other factors, as well as characteristics of the edit itself. However, as a general matter, the preliminary model can be trained by instances or data associated with a plurality of structured or unstructured data that have been found to be predictive for edit management, which can comprise the content usage history for an electronic content. Some examples of these data features are presented below with reference to FIGS. 6A and 6B. However, it should be understood that this list is provided for purposes of example only, and the system may additionally or alternatively refer to a wide variety of data features or parameters that are not listed in FIGS. 6A and 6B to help determine whether an edit is substantive or non-substantive.

Referring first to FIG. 6A, some example features of data that may be collected or obtained by the system to predict whether an edit is likely to be made, and/or to determine whether an edit that has been made was intentional are listed. These features can comprise unstructured data or structured data. For purposes of this description, structured data refers to information with a high degree of organization, such that inclusion in a relational database is seamless and readily searchable by simple, straightforward search engine algorithms or other search operations. Structured data may be organized by specific headings and labels and/or that are easily interpretable by a computer system. For example, structured data may include a data classified by fields, codes, or is stored in a relational-type structure. Structured data is usually readily located, interpreted, and relatable to other data. It may include any type of data, such as text (e.g., a person's name) or numerical values (a person's age), and/or can include the information that relates one piece of data to another (e.g., the age 38 is for the person who is named Alice).

In contrast, unstructured data includes data that may be freeform or generally associated to a broader heading or data field, such as natural language electronic content, including but not limited to notes, emails, word documents, images, sound files, and other such electronic content. Such data may also include hard-copy information that was scanned into electronic form, or data that may have been classified but cannot be understood or evaluated by the current application. In many cases, the unstructured data carries no tags (metadata about the data) and has no established schema, ontology, glossary, or consistent organization.

The table of FIG. 6A lists some examples of data that can be collected or referenced by an MLA to assess the likelihood of an edit being substantive, and/or affect the degree of confidence in such a prediction. In some implementations, these types of data can comprise content characteristics, and can be understood to at least partly convey or represent an overall significance of the edit and its scope. In FIG. 6A, a first example is an "Amount added" parameter 602, which indicates how many words were added during the edit event, and a second example is an "Amount deleted" parameter 604. Larger values for either parameter 602 or 604 indicate a higher likelihood of a substantive edit. In some cases, information associated with words can be limited to an edit targeting a limited or specific portion of the larger content. In other words, while multiple edit events may occur throughout a localized document over a similar period of time by the same user, each edit event can be assessed individually as changes to specific content elements. Another example is an "Amount changed" parameter 606 that reflects the number, percentage, or proportion of words that were deleted, added, or modified, relative to the larger content. The greater this value, the more likely the edit is substantive. A "stylistic elements" parameter 610 describes whether and to what extent the edit included any stylistic devices or expressions, and can be used to indicate an emphasis on the localization of the content (suggesting a non-substantive edit). Similarly, a "grammatical elements" parameter 612 describes whether and to what extent the edit included grammar-based changes such as punctuation, capitalization, spelling, or other corrections and mechanical elements, which would suggest a non-substantive edit. Whether the content element being edited included various media elements 614 can also affect the prediction, as changes to images, videos, slides, posters, presentations, or other non-text based content can indicate a likelihood of a substantive edit.

Furthermore, a "semantic attributes" parameter 616 can provide a score directed to how meaningful the edit content was, where an edit with a greater semantic score is more likely to be substantive. For purposes of example, semantic attributes can be generally understood to refer to aspects of an electronic document that provide or increase contextual understanding of the described material, and/or can facilitate comprehension of relationship(s) between various content elements. Semantic attributes can allow for different levels of meaning to be added to a document, and are frequently non-textual in nature or manifestation. In other words, while the document itself conveys a great deal of information via text, other aspects can be significant with respect to the comprehension of such text. As some non-limiting examples, semantic attributes can include the use and placement of a title, subtitle, bibliography, dates, author names, table of contents, bullet lists, numbered sections, citation indications, references, formatting (e.g., underline, bold, italic, font type, highlighting, etc.), tables, borders, footnotes, headers, footers, graphs, icons, symbols, images, font size, indentation, alignment, line and paragraph spacing, margins, white space, symbols, color usage, brightness, narrative components, and other such details. For the most part, semantic attributes can be appearance-based or serve as visual cues that—for a reader viewing the document—quickly convey information beyond the text itself. However, in other implementations, sematic attributes can also be auditory-based, or can be an integral part of the text.

A "type of document" parameter 618 can provide information about the format or application used to create and/or present the document, such as a word document, spreadsheet, video, presentation, web content, or other such document types. Each type of document can be associated with a distinct factor that either decreases or increases the overall likelihood of an edit to that content being substantive. For example, edits to document that is a spreadsheet can be more likely as a general matter to be substantive than edits to a poster. In addition, a readability score 620 can describe the average length of sentences and words in the edit. Generally, a higher readability score will increase the likelihood of an edit that has been classified as substantive as also being a candidate for automatic propagation to the base language version. Similarly, a translation score 622 can describe the confidence in the content as a whole (or portions thereof) being correctly translated. If a document has a low translation score, it is more likely that edits made to the document are directed toward non-substantive type corrections to the language. Finally, a relevance score 624 can represent a comparison between the words used in the edit and the words used in the original document. A higher level of relevance will increase the likelihood of an edit that has been classified as substantive as also being a candidate for automatic propagation to the base language version.

In some implementations, these types of data can comprise "usage characteristics" or "contributor characteristics" and/or may be understood to at least partly convey or represent a usage history for a user. Thus, the usage history may be obtained based on an aggregation of various parameters or characteristics. It should be understood that reference to the phrase "usage history" includes any system-wide activity associated with a user that has occurred prior to the detection of the edit event. Thus, the usage history can be recorded, logged, captured, measured, and/or monitored over hours, days, months, or years, as well as only minutes or seconds prior to and including the edit event.

The table of FIG. 6B lists some examples of user-based data (contributor characteristics 650) that can be collected or referenced by an MLA to assess the likelihood of an edit being substantive, and/or affect the degree of confidence in such a prediction. As a first example, if a number of previously submitted edits 652 (e.g., edit events) associated with this user is relatively high or above a particular threshold, it may be more likely that the edits are substantive. However, this parameter can also more specifically capture information about the previous edit events, and if a pattern of a particular type of edit is identified, it becomes more likely that the pattern will continue. Thus, if the user has a history of providing non-substantive edits to electronic content, it will be more likely that the current edit is also non-substantive. Similarly, if the user has a history of providing substantive edits to electronic content, it will be more likely that the current edit is also substantive. Another example is an assessment of the user by a topic owner 654, which can affect the likelihood of a prediction toward one type or another (i.e., if the topic owner identifies edits of this user as being non-substantive, it is more likely the current edit is also non-substantive). Furthermore, if the current edit is directed toward a document whose topic overlaps with the topics of other content that have been previously edited by this user, this can signal expertise in those topics and increase the likelihood that such an edit was substantive.

In addition, ratings of previous edits can improve the likelihood that an edit by this user was (a) substantive and (b) should be automatically propagated. For example, well received substantive edits for other portions of the same document 658, as well as well received substantive edits for other documents directed to a similar subject area 660 will increase the likelihood of an edit that has been classified as substantive as also being a candidate for automatic propagation to the base language version. Contributor details 662 such as frequency of activity, average length of content access, reviews by other users, and other details can also affect the likelihood of an edit's being tagged as substantive. Information regarding the contributing user's education 664, work experience and/or professional qualifications 666, membership in particular organizations or affiliations 668, social media tags 670, and/or profile information 672 can also impact the prediction. For example, users with higher education, education in subjects related to the material presented in the document, work experience or membership in groups that suggest familiarity or expertise with material discussed in the document, social media tags indicating the user has other skills or credentials that relate to the document topic, and/or details in the user profile describing such a background, can each increase the likelihood of the user's edit(s) being classified as substantive as well as the likelihood that the edit should be automatically propagated. In some implementations, the contributor can also have a reputation score that may be the result of other users (such as document managers) reviewing edits made by the contributor and grading or providing feedback to such edits. In another implementation, a document manager can identify one or more "trusted contributors" who are pre-approved to make edits that will automatically propagate to the base electronic content. Finally, a device location 674, representing the geographic location or NatIP of the device used to access the file, can indicate whether the user is a native resident of the region associated with the localized document, which can increase the likelihood that this is a non-substantive edit. In other implementations, the system may utilize feature clustering, where one event or behavior can indicate further actions are more or less likely. For example, if a first parameter indicated the user has previously made substantive edits, it may be highly predictive of a subsequent substantive edit being received from said user.

In different implementations, both content characteristics and user characteristics can be determined and/or based on an array of variables or events, including both a context of use and a state of use. For example, a context of use can be determined based on internal and external variables including the physical environment where a device is used or biological data associated with a person who uses the device. Similarly, a state of use of the computing system or content can be determined based on the state (or status) of one or more components of the computing system (such as the state of one or more active applications that are being used by person). In some cases, the state of use can be linked to the context of use and help define an event in which the state of use has occurred. This can provide a more accurate determination of the usage history. Furthermore, the state of use can be broad in scope (e.g., is the application active or not) or it can be defined using a relatively complex set of variables to include additional information pertaining to the usage and/or the manner of usage (e.g., information pertaining to the use of one or more applications, as such, for example, how long an application has been open and what files it has opened, what feature has been selected or viewed, the duration of each session, input/output connected with an application, and other such data). This and other types of data can allow more intelligent decisions to occur with respect to the implementations described herein. For example, as noted above, a usage history can be the basis for predicting future actions or use of a computing system by a user.

It should be understood that the names and specific features of each parameter shown in FIGS. 6A and 6B and described herein can differ from those presented here. Furthermore, these parameters are shown for illustrative purposes only, and should by no means be understood to limit the types of data that may be collected for use by the proposed system.

Figure 7:
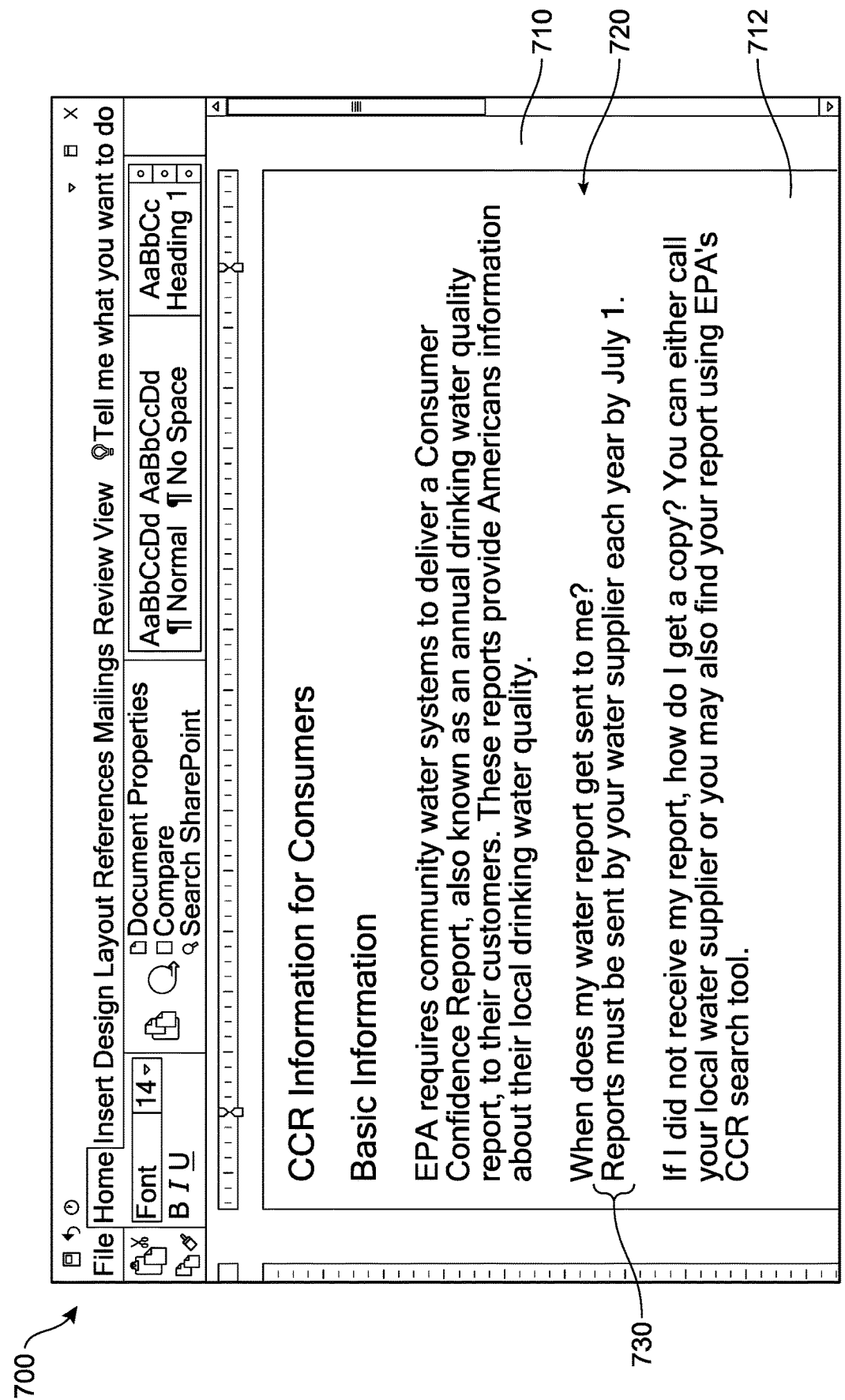
FIG. 7 is a display diagram illustrating an implementation of a version of a document with localized content.
Figure 8:
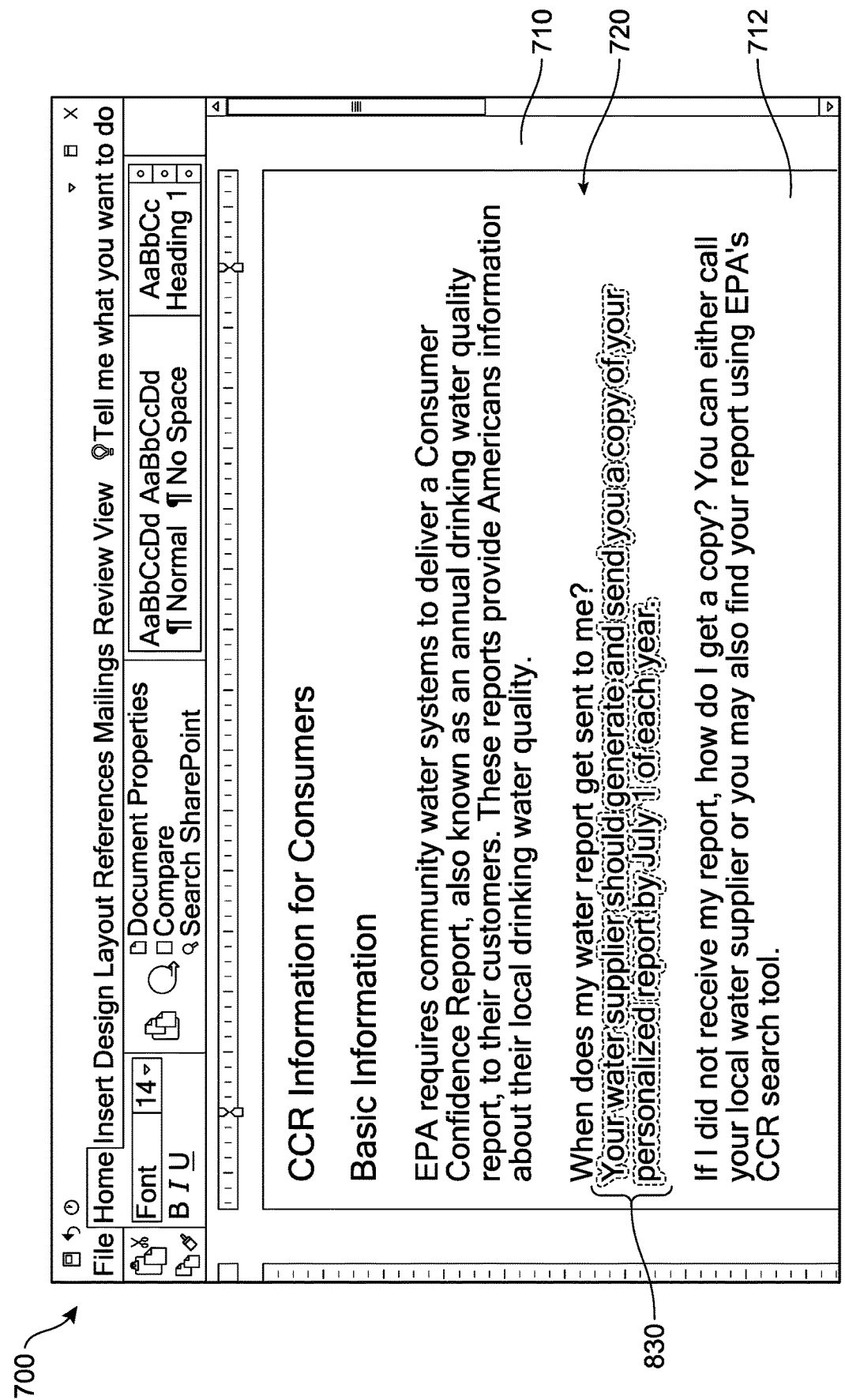
FIG. 8 is a display diagram illustrating an implementation of the version of the document of FIG. 7 with edited content.
Figure 9:
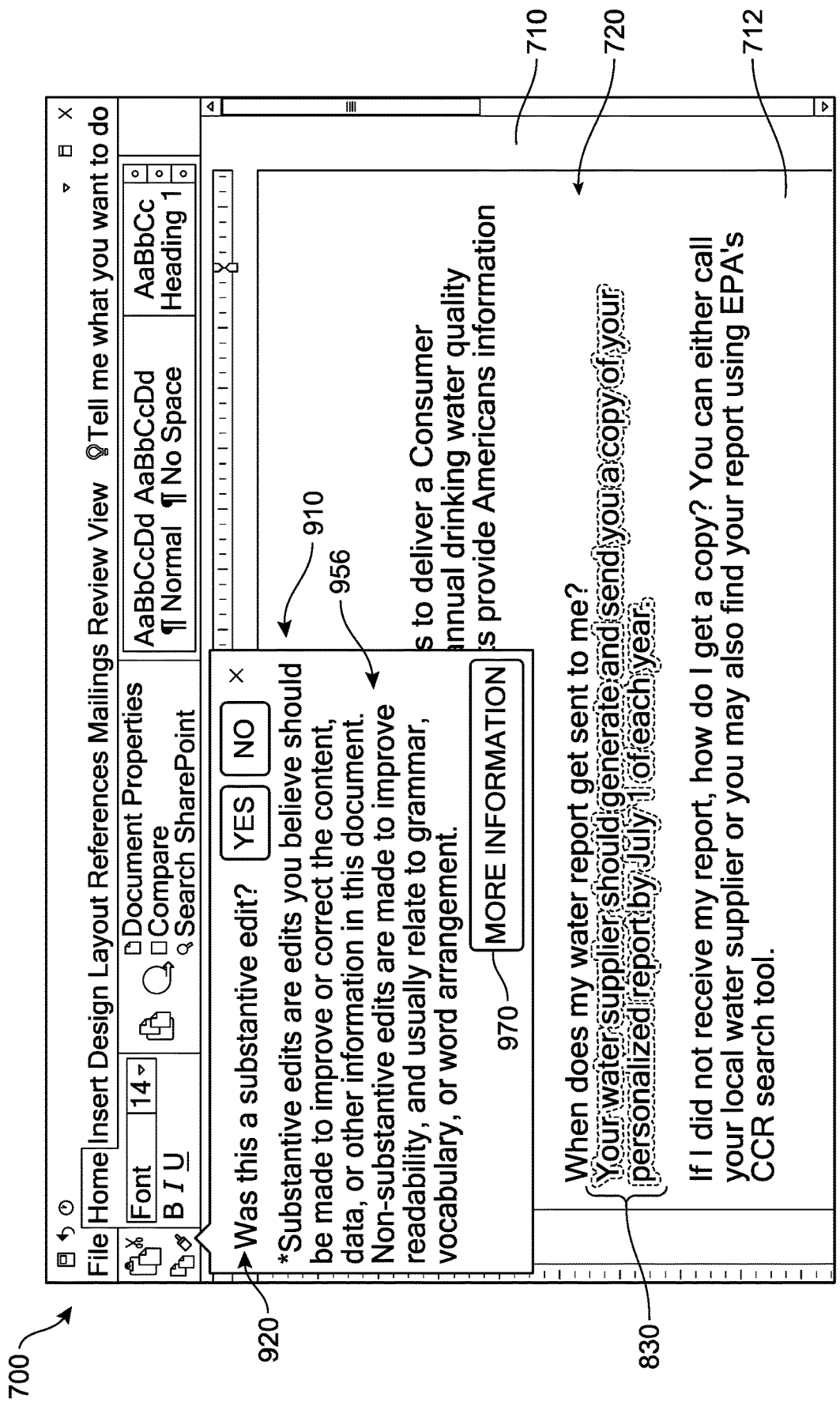
FIG. 9 is a display diagram illustrating an implementation of the document of FIG. 7 where the edited content is associated with a query event.

Referring now to the sequence of FIGS. 7-9, one implementation of the proposed system is illustrated. In FIG. 7, a display 700 presents an interface for a second application 710. For purposes of simplicity, the second application 710 in FIG. 7 is also word processing platform, and a user has opened or otherwise accessed an electronic content 712 associated with the second application 710. During various user interactions with the second application 710, a user may scroll through or otherwise interact with electronic content 712, such as a first portion 720 including a content element 730. As one example, the system can predict—based on factors including but not limited to this user's previous recorded usage with respect to this particular electronic content 712 as well as other documents, and other features described above with respect to FIG. 6B—that edits made by the user have a high likelihood of being substantive (and a correspondingly low likelihood of being non-substantive). However, this is an optional process. If the user inputs text or make any edits, the system can interpret such action as being associated with an edit event. In some but not all implementations, the determination can be associated with an edit type probability threshold value assigned to or generated for the particular user. The threshold can be lowered if a document manager wishes the system to be more sensitive to substantive edits, or increased if a user wishes the system to be more selective as to the types of edits that might be deemed substantive.

Referring next to FIG. 8, after the user input new text (see an inserted content element 830) and/or delete original text (content element 730), the system can initiate an assessment as to the type of edit that was received. This can occur within a few seconds or minutes after the edit to a specific portion of the content is received. As shown in FIG. 9, in cases where the model is not able to confidently classify the edit, the system can immediately or very soon after the change automatically present a native control to the user, requesting that the user confirm whether the edit was substantive. In this sequence, the editing user has deleted the content element 730 in FIG. 7 ("Reports must be sent by your water supplier each year by July 1.") and added a new set of words with inserted content element 830 ("Your water supplier should generate and send you a copy of your personalized report by July 1 of each year."), and the system is attempting to confirm that this edit event represents a substantive edit.

In FIG. 9, the system displays a native control in the form of a notification 910, providing a query 920 and a plurality of options 960 related to the management of the edit. While the native control (notification 910) presented is shown here as a floating dialog window, in other implementations, the native control can include any other type of user interface such as a pop-up window, a floating menu, a dialog box or callout, a window or drop-down extending from a main menu, or other application communication or presentation means. Furthermore, in FIG. 9, the notification 910 is overlaid on the second application's main interface. The specific location of the notification 910 represented in FIG. 9 is intended to underscore the relationship of the message of the notification 910 with the electronic content 712. However, it should be understood that in other implementations, the notification 910 may be displayed or generated anywhere else on the screen(s) associated with the client's system, including spaced apart from, adjacent to, or around the second application 710.

In different implementations, the period of time between the occurrence of the edit to the presentation of the notification may vary and/or be configurable by the user. In some cases, the default setting may be five seconds, permitting the user time to make further changes without system intervention, and/or giving the system sufficient time to collect information upon which to perform its assessment and make its determination. In other implementations, the notification can be presented over any period ranging from less than one second to one minute or more. In addition, in some implementations, the system can be configured to present a query about the edit only once per session. In other words, if a system determines an edit is substantive and the user agrees, subsequent edits during the same session will no longer trigger the presentation of a notification.

As shown in FIG. 9, the query 920 asks the user "Was this a substantive edit?" and offers two input mechanisms ("YES" and "NO"). The notification 910 also includes an optional message to the user presenting further clarifying information 956 ("*Substantive edits are edits you believe should be made to improve or correct the content, data, or other information in this document. Non-substantive edits are made to improve readability in the current language, and usually relate to grammar, vocabulary, or word arrangement."). The user may also view other information and settings via selectable option 970. However, it should be understood that the GUI shown in FIG. 9 is for illustrative purposes only, and by no means limits the type of information or wording that may be presented to a user. Furthermore, in some cases, the GUI may be a more passive alert, simply informing the user that there may be an inadvertent edit in the document, without any further query or options shown. In other implementations, there may be fewer or greater number of options, and/or the options made available may differ from those shown here. In other implementations, any other alphanumeric text or graphics may be displayed in conjunction with the message. In different implementations, each option type can be associated with a variety of actions. For example, a Settings option may be shown offering users the opportunity to adjust the display, content, format, communication, access, and other settings associated with the edit management tools. The Settings option can also be configured to allow users to add or modify the available options or policies, create or delete specific notification messages, modify current notifications, change the default management paradigm, as well as select or upload different graphical icons to represent the display alongside or in lieu of the notifications. It should be understood that a Settings option may be made available on some or all of the GUIs, whether or not explicitly identified, or the Settings option may be accessible via an option in the application's main menu.

Furthermore, in different implementations, any of the menus or native controls and options described herein can also include or be associated with an optional tool overview or Help tool. Such options can be configured to provide an introduction or summary of the offered feature(s) or tool(s), including but not limited to presentation of a teaching guide, FAQs, search for help topics, images, schematics, tutorial overviews, screenshots, photos, slideshow, video, audio, and other such content or guidance.

In some implementations, if the notification appears but is ignored or not in focus in the application, the system can remove the notification after a period of time that can be configured by the user. This period of time can be a few seconds, or can be 'infinite', meaning the notification remains throughout the entire length of the access session. In one implementation, if the notification appears and remains in focus in the application, the system may maintain the presentation of the notification until the user selects one of the options or dismisses the window.

Figure 10:
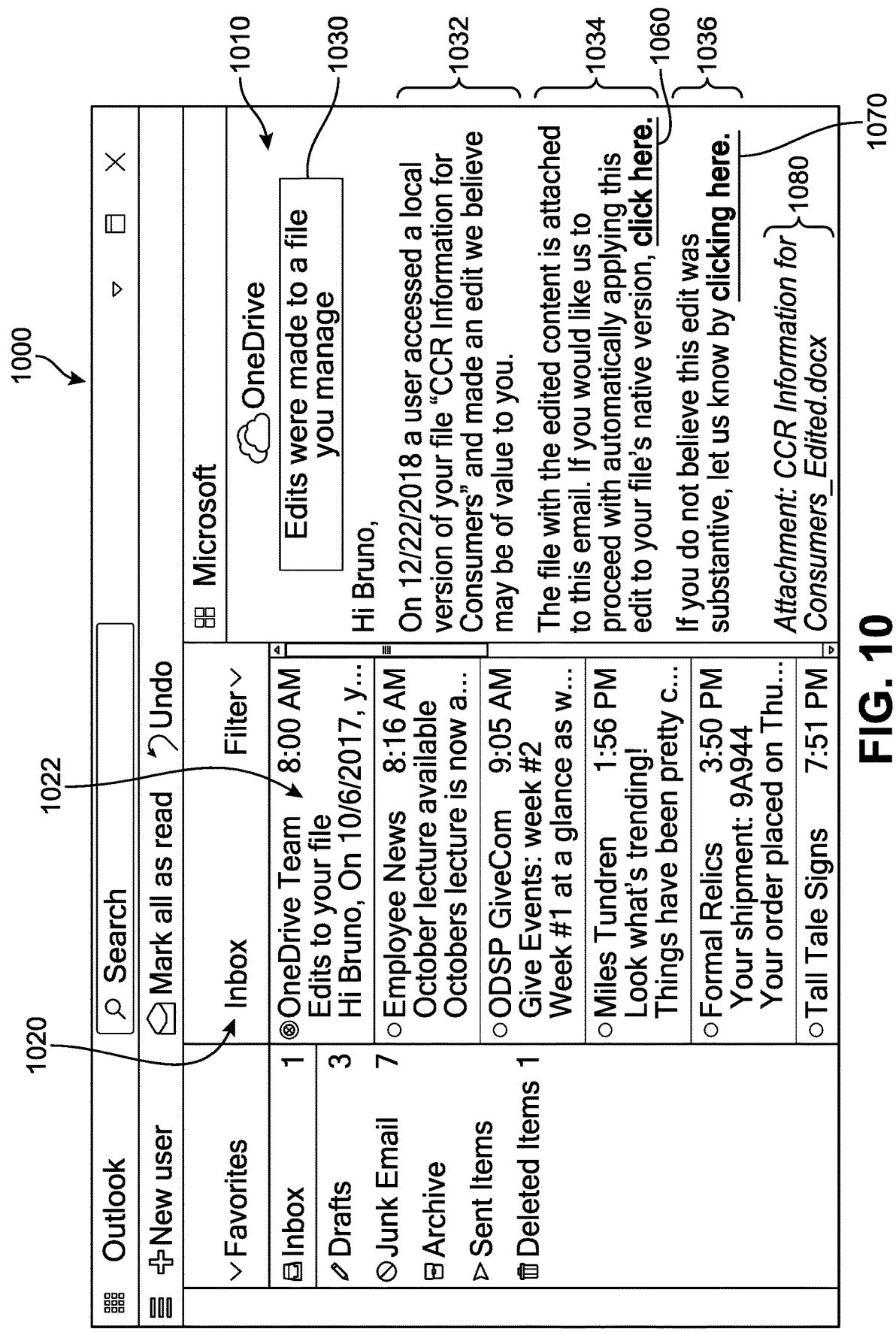
FIG. 10 is a representation of a device display with an implementation of a notification of the occurrence of a potentially substantive edit.

Following the detection of an edit event for a localized version of a document, in different implementations, a document manager may be notified at one or more stages in the process. These notifications can be automated, and may be transmitted per system settings and/or user preferences. One example is shown in FIG. 10, where a user interface 1000 displaying e-mail messages for a user account is depicted. While an e-mail message is presented for purposes of this example, it should be understood that in other implementations, any other form of communication associated with the user's account may be used to provide such information, including but not limited to text messages, chat messages, pop-up windows, automated phone calls, symbolic indicators (shown briefly or multiple occasions on the display while the processes occur), or other native controls can be used. In this case, an e-mail message ("message") 1010 from the system is delivered to the e-mail account linked to the user account associated with the managing the original file. A subject line 1022 alerts the user that this is regarding "Edits to your file". The message 1010 includes a subject summary 1030 "Edits were made to a file you manage". In some implementations, the message 1010 can further include a section comprising (for example) a general summary 1032 that can inform the user of the edit event that was detected ("Hi Bruno, On 12/22/2018 a user accessed a local version of your file "CCR Information for Consumers" and made an edit we believe may be of value to you."). In one implementation, this can be followed by an action summary 1034 that can describe a suggested next step related to this event ("The file with the edited content is attached to this email. If you would like us to proceed with automatically applying this edit to your file's native version, click here."), thereby including an embedded link 1060 for triggering the propagation process. Furthermore, the message 1010 can include a redirect 1036 whereby the user can disagree with the determination made by the system ("If you do not believe this edit was substantive, let us know by clicking here."), providing another embedded link for accessing further information and options to reclassify the edit event. Such options can also offer or allow the user to navigate to other menu interfaces from which the user can make changes to their notification and automated propagation settings, as well as undo a propagation if so desired. For example, the user may wish to opt-out of one or more steps of the automated processes, opt-in to other services to increase automation, and/or request that notifications be provided via a different mechanism. Furthermore, in some implementations, the message can include an option to download or access with at least a translation of the edit, or a link to the localized version, for example as an attachment 1080.

Figure 11:
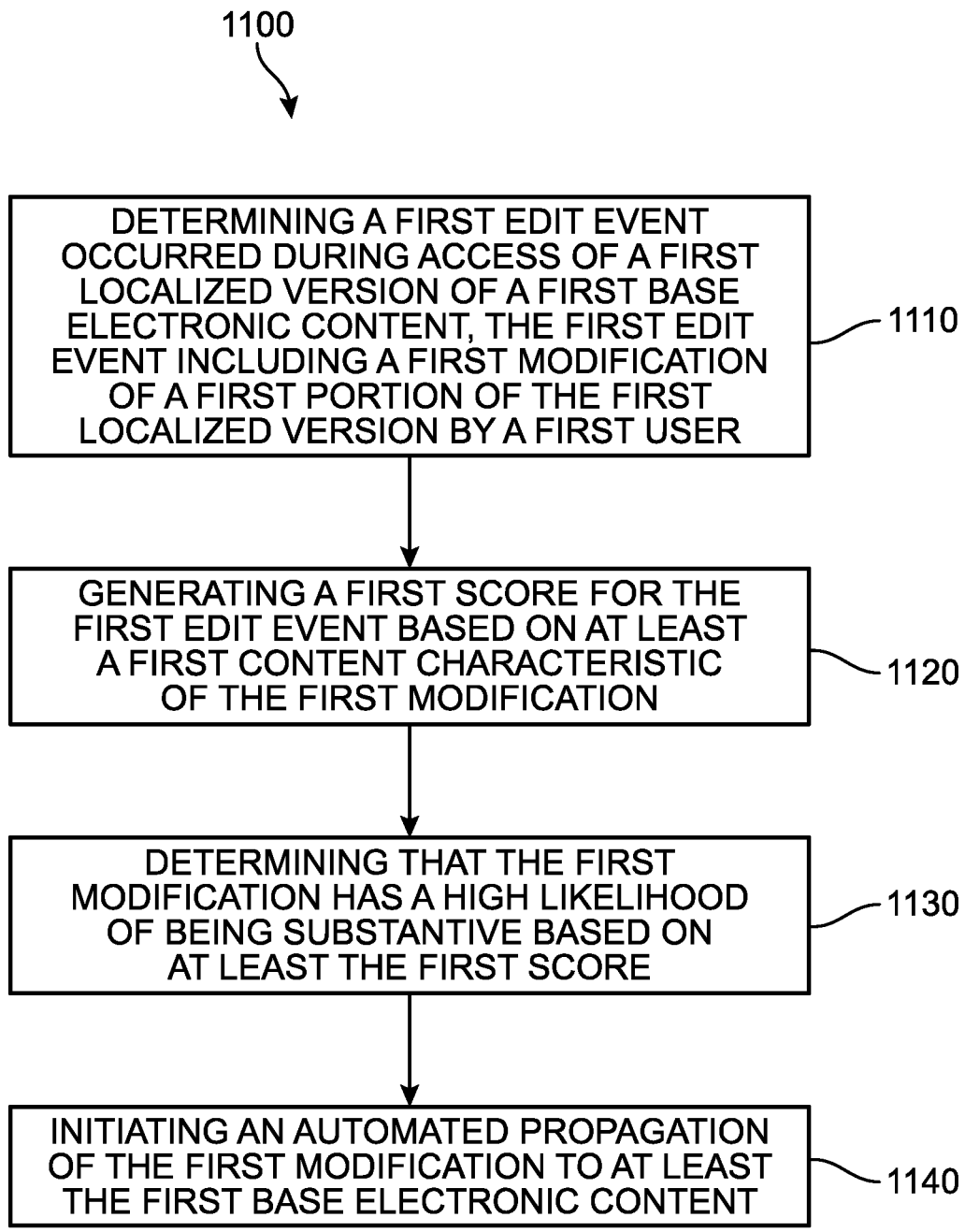
FIG. 11 is a flow diagram illustrating an implementation of a process for managing edits.

For purpose of clarity, FIG. 11 presents a flow chart illustrating an implementation of a method 1100 of managing edits to localized versions of electronic content. In the example of FIG. 11, a first step 1110 includes determining that a first edit event has occurred during access of a first localized version of a first base electronic content. The first edit event includes a first modification of a first portion of the first localized version by a first user. A second step 1120 includes generating a first score for the first edit event based on at least a first content characteristic (see FIG. 6A) of the first modification. In a third step 1130, the method includes determining that the first modification has a high likelihood of being substantive based on at least the first score (e.g., above a particular confidence threshold). A fourth step 1140 includes initiating, in response to the determination that the first modification has a high likelihood of being substantive, an automated propagation of the first modification to at least the first base electronic content.

In different implementations, additional aspects or features may be included. For example, in some implementations, the first content characteristic describes a number of words added, changed, or deleted during the first edit event. In another example, the first score is also based on a first user characteristic that describes a previous modification history by the first user. In some cases, the first score is also based on a first user characteristic that describes a previous professional experience by the first user related to a topic presented in the first base electronic content. In another example, the automated propagation includes a translation of the first modification to a base language in which the base electronic content is presented and incorporating the translation of the first modification into the base electronic content.

In other implementations, additional steps may be included. For example, in some implementations, the method can further include determining that a second edit event has occurred during access of the first localized version, where the second edit event includes a second modification of a second portion of the first localized version by the first user. The method can also include generating a second score for the first edit event based on at least a second content characteristic of the second modification, and determining that the second modification has a low likelihood of being substantive based on at least the second score. In addition, the method can include causing, for example in response to the determination that the second modification has a low likelihood of being substantive, a first user interface element including a first option for tagging the second modification as substantive to be presented to the first user, and then causing, in response to receiving a first user input from the first user indicating a selection of the first option, a first user message to be transmitted to a document manager for the first base electronic content.

In some implementations, for example in cases where the first user message includes a second option for tagging the second modification as substantive, the method can also include receiving a second user input from the document manager indicating a selection of the second option, and initiating, in response to receiving the second user input, an automated propagation of the second modification to at least the first base electronic content the method. In one implementation, the second content characteristic describes an extent to which the second modification included changes associated with punctuation of the second portion.

As another example, the method further includes determining that a second edit event has occurred during access of the first localized version, the second edit event including a second modification of a second portion of the first localized version by the first user, as well as generating a second score for the first edit event based on at least a second content characteristic of the second modification. The method can also include determining that the second modification has an intermediate likelihood of being substantive based on at least the second score, and then causing (in response to the determination that the second modification has an intermediate likelihood of being substantive) a first user message to be transmitted to a document manager for the first base electronic content, where the first user message includes a first option for tagging the second modification as substantive. The method can also include steps of receiving a first user input from the document manager indicating a selection of the first option, and initiating, in response to receiving the first user input, an automated propagation of the second modification to at least the first base electronic content.

In some implementations, the method can involve determining that a second edit event has occurred during access of a second localized version of a second base electronic content, where the second edit event includes a second modification of a second portion of the second localized version by a second user. The method may also include generating a second score for the second edit event based on at least the first content characteristic of the second modification, and determining that the second modification has a high likelihood of being substantive based on at least the second score. Finally, the method could include causing, in response to the determination that the second modification has a high likelihood of being substantive, a first user message to be transmitted to a document manager for the second base electronic content, the first user message including a notification of the occurrence of the second edit event.

The detailed examples of systems, devices, and techniques described in connection with FIGS. 1-11 are presented herein for illustration of the disclosure and its benefits. Such examples of use should not be construed to be limitations on the logical process implementations of the disclosure, nor should variations of user interface methods from those described herein be considered outside the scope of the present disclosure. In some implementations, various features described in FIGS. 1-11 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations, and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a particular processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In implementations in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across a number of machines. Processors or processor-implemented modules may be located in a single geographic location (for example, within a home or office environment, or a server farm), or may be distributed across multiple geographic locations.

Figure 12:
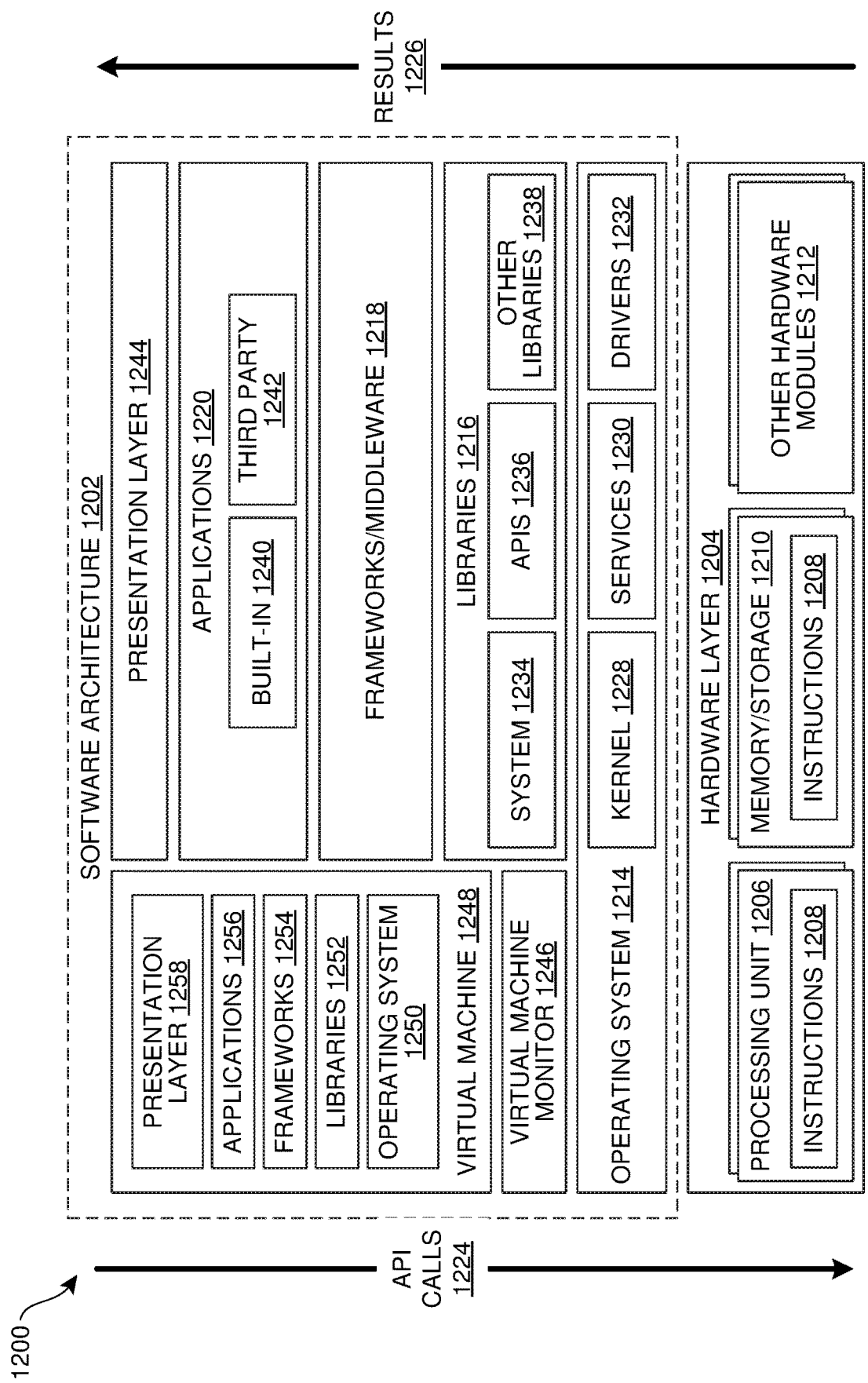
FIG. 12 is a block diagram of an example computing device, which may be used to provide implementations of the mechanisms described herein.

FIG. 12 is a block diagram 1200 illustrating an example software architecture 1202, various portions of which may be used in conjunction with various hardware architectures herein described, which may implement any of the above-described features. FIG. 12 is a non-limiting example of a software architecture and it will be appreciated that many other architectures may be implemented to facilitate the functionality described herein. The software architecture 1202 may execute on hardware such as a first device 102 of FIG. 1A and second device 300 of FIG. 3A that include, among other things, document storage 1070, processors, memory, and input/output (I/O) components. A representative hardware layer 1204 is illustrated and can represent, for example, the devices described herein. The representative hardware layer 1204 includes a processing unit 1206 and associated executable instructions 1208. The executable instructions 1208 represent executable instructions of the software architecture 1202, including implementation of the methods, modules and so forth described herein. The hardware layer 1204 also includes a memory/storage 1210, which also includes the executable instructions 1208 and accompanying data. The hardware layer 1204 may also include other hardware modules 1212. Instructions 1208 held by processing unit 1208 may be portions of instructions 1208 held by the memory/storage 1210.

The example software architecture 1202 may be conceptualized as layers, each providing various functionality. For example, the software architecture 1202 may include layers and components such as an operating system (OS) 1214, libraries 1216, frameworks 1218, applications 1220, and a presentation layer 1244. Operationally, the applications 1220 and/or other components within the layers may invoke API calls 1224 to other layers and receive corresponding results 1226. The layers illustrated are representative in nature and other software architectures may include additional or different layers. For example, some mobile or special purpose operating systems may not provide the frameworks/middleware 1218.

The OS 1214 may manage hardware resources and provide common services. The OS 1214 may include, for example, a kernel 1228, services 1230, and drivers 1232. The kernel 1228 may act as an abstraction layer between the hardware layer 1204 and other software layers. For example, the kernel 1228 may be responsible for memory management, processor management (for example, scheduling), component management, networking, security settings, and so on. The services 1230 may provide other common services for the other software layers. The drivers 1232 may be responsible for controlling or interfacing with the underlying hardware layer 1204. For instance, the drivers 1232 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 1216 may provide a common infrastructure that may be used by the applications 1220 and/or other components and/or layers. The libraries 1216 typically provide functionality for use by other software modules to perform tasks, rather than rather than interacting directly with the OS 1214. The libraries 1216 may include system libraries 1234 (for example, C standard library) that may provide functions such as memory allocation, string manipulation, file operations. In addition, the libraries 1216 may include API libraries 1236 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 1216 may also include a wide variety of other libraries 1238 to provide many functions for applications 1220 and other software modules.

The frameworks 1218 (also sometimes referred to as middleware) provide a higher-level common infrastructure that may be used by the applications 1220 and/or other software modules. For example, the frameworks 1218 may provide various graphic user interface (GUI) functions, high-level resource management, or high-level location services. The frameworks 1218 may provide a broad spectrum of other APIs for applications 1220 and/or other software modules.

The applications 1220 include built-in applications 1240 and/or third-party applications 1242. Examples of built-in applications 1240 may include, but are not limited to, a contacts application, a browser application, a location application, a media application, a messaging application, and/or a game application. Third-party applications 1242 may include any applications developed by an entity other than the vendor of the particular platform. The applications 1220 may use functions available via OS 1214, libraries 1216, frameworks 1218, and presentation layer 1244 to create user interfaces to interact with users.

Some software architectures use virtual machines, as illustrated by a virtual machine 1248. The virtual machine 1248 provides an execution environment where applications/modules can execute as if they were executing on a hardware machine (such as the machine 1000 of FIG. 10, for example). The virtual machine 1248 may be hosted by a host OS (for example, OS 1214) or hypervisor, and may have a virtual machine monitor 1246 which manages operation of the virtual machine 1248 and interoperation with the host operating system. A software architecture, which may be different from software architecture 1202 outside of the virtual machine, executes within the virtual machine 1248 such as an OS 1250, libraries 1252, frameworks 1254, applications 1256, and/or a presentation layer 1258.

Figure 13:
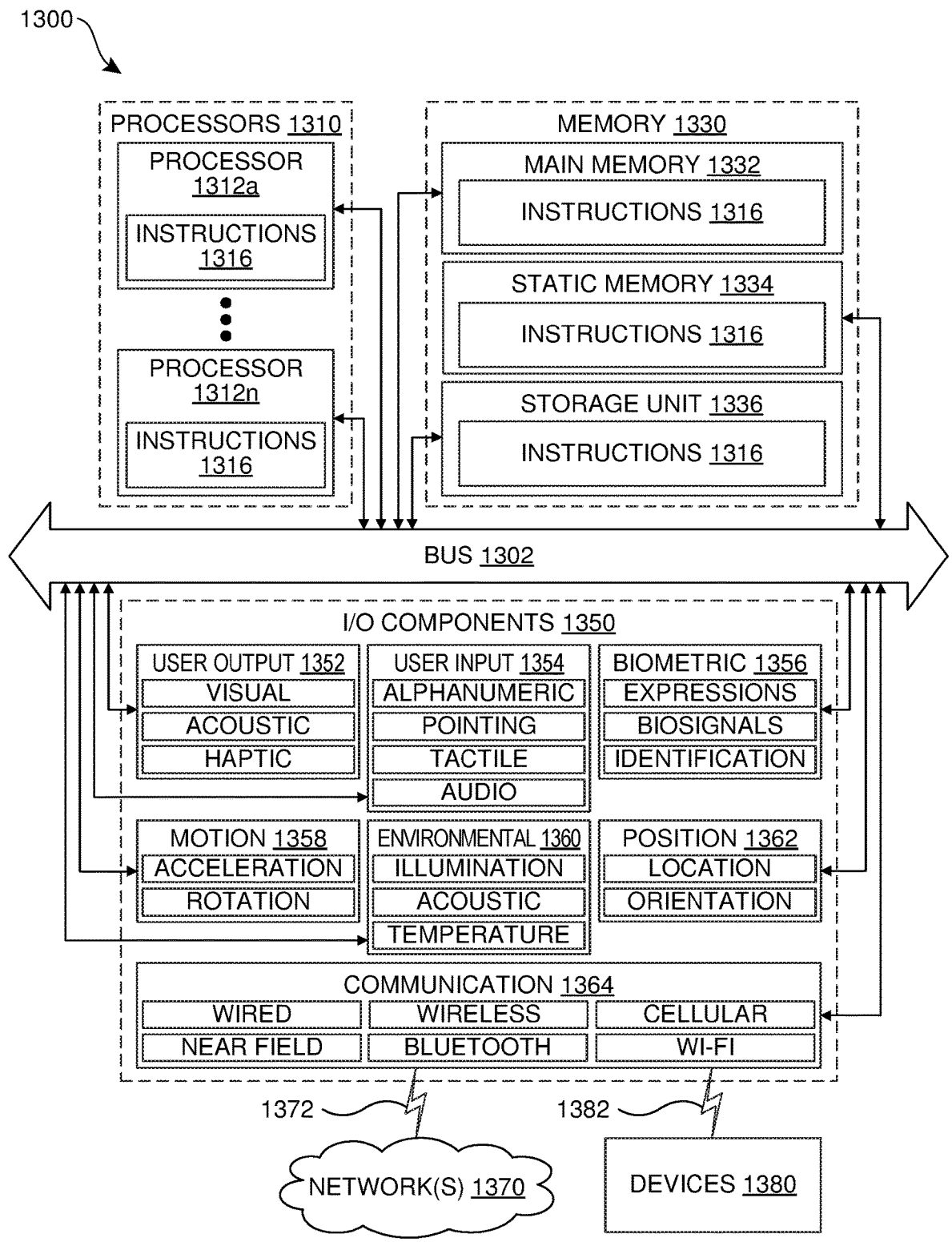
FIG. 13 is a block diagram illustrating components of an example machine configured to read instructions from a machine-readable medium.

FIG. 13 is a block diagram illustrating components of an example machine 1300 configured to read instructions from a machine-readable medium (for example, a machine-readable storage medium) and perform any of the features described herein. The example machine 1300 is in a form of a computer system, within which instructions 1316 (for example, in the form of software components) for causing the machine 1300 to perform any of the features described herein may be executed. As such, the instructions 1316 may be used to implement modules or components described herein. The instructions 1316 cause unprogrammed and/or unconfigured machine 1300 to operate as a particular machine configured to carry out the described features. The machine 1300 may be configured to operate as a standalone device or may be coupled (for example, networked) to other machines. In a networked deployment, the machine 1300 may operate in the capacity of a server machine or a client machine in a server-client network environment, or as a node in a peer-to-peer or distributed network environment. Machine 1300 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 1300 is illustrated, the term "machine" includes a collection of machines that individually or jointly execute the instructions 1316.

The machine 1300 may include processors 1310, memory 1330, and I/O components 1350, which may be communicatively coupled via, for example, a bus 1302. The bus 1302 may include multiple buses coupling various elements of machine 1300 via various bus technologies and protocols. In an example, the processors 1310 (including, for example, a central processing unit (CPU), a graphics processing unit (GPU), a digital signal processor (DSP), an ASIC, or a suitable combination thereof) may include one or more processors 1312a to 1312n that may execute the instructions 1316 and process data. In some examples, one or more processors 1310 may execute instructions provided or identified by one or more other processors 1310. The term "processor" includes a multi-core processor including cores that may execute instructions contemporaneously. Although FIG. 13 shows multiple processors, the machine 1300 may include a single processor with a single core, a single processor with multiple cores (for example, a multi-core processor), multiple processors each with a single core, multiple processors each with multiple cores, or any combination thereof. In some examples, the machine 1300 may include multiple processors distributed among multiple machines.

The memory/storage 1330 may include a main memory 1332, a static memory 1334, or other memory, and a storage unit 1336, both accessible to the processors 1310 such as via the bus 1302. The storage unit 1336 and memory 1332, 1334 store instructions 1316 embodying any one or more of the functions described herein. The memory/storage 1330 may also store temporary, intermediate, and/or long-term data for processors 1310. The instructions 1316 may also reside, completely or partially, within the memory 1332, 1334, within the storage unit 1336, within at least one of the processors 1310 (for example, within a command buffer or cache memory), within memory at least one of I/O components 1350, or any suitable combination thereof, during execution thereof. Accordingly, the memory 1332, 1334, the storage unit 1336, memory in processors 1310, and memory in I/O components 1350 are examples of machine-readable media.

As used herein, "machine-readable medium" refers to a device able to temporarily or permanently store instructions and data that cause machine 1300 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 1316) for execution by a machine 1300 such that the instructions, when executed by one or more processors 1310 of the machine 1300, cause the machine 1300 to perform and one or more of the features described herein. Accordingly, a "machine-readable medium" may refer to a single storage device, as well as "cloud-based" storage systems or storage networks that include multiple storage apparatus or devices.

The I/O components 1350 may include a wide variety of hardware components adapted to receive input, provide output, produce output, transmit information, exchange information, capture measurements, and so on. The specific I/O components 1350 included in a particular machine will depend on the type and/or function of the machine. For example, mobile devices such as mobile phones may include a touch input device, whereas a headless server or IoT device may not include such a touch input device. The particular examples of I/O components illustrated in FIG. 13 are in no way limiting, and other types of components may be included in machine 1300. The grouping of I/O components 1350 are merely for simplifying this discussion, and the grouping is in no way limiting. In various examples, the I/O components 1350 may include user output components 1352 and user input components 1354. User output components 1352 may include, for example, display components for displaying information (for example, a liquid crystal display (LCD) or a projector), acoustic components (for example, speakers), haptic components (for example, a vibratory motor or force-feedback device), and/or other signal generators. User input components 1354 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 1350 may include biometric components 1356 and/or position components 1362, among a wide array of other environmental sensor components. The biometric components 1356 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 1362 may include, for example, location sensors (for example, a Global Position System (GPS) receiver), altitude sensors (for example, an air pressure sensor from which altitude may be derived), and/or orientation sensors (for example, magnetometers).

The I/O components 1350 may include communication components 1364, implementing a wide variety of technologies operable to couple the machine 1300 to network(s) 1370 and/or device(s) 1380 via respective communicative couplings 1372 and 1382. The communication components 1364 may include one or more network interface components or other suitable devices to interface with the network(s) 1370. The communication components 1364 may include, for example, components adapted to provide wired communication, wireless communication, cellular communication, Near Field Communication (NFC), Bluetooth communication, Wi-Fi, and/or communication via other modalities. The device(s) 1380 may include other machines or various peripheral devices (for example, coupled via USB).

In some examples, the communication components 1364 may detect identifiers or include components adapted to detect identifiers. For example, the communication components 1364 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 1362, such as, but not limited to, geo-location via Internet Protocol (IP) address, location via Wi-Fi, cellular, NFC, Bluetooth, or other wireless station identification and/or signal triangulation.

Furthermore, implementations of the present disclosure can make use of any of the features, systems, components, devices, and methods described in U.S. Pat. No. 8,660,978 to Hinckley et al., issued Feb. 25, 2014 and titled "Detecting and Responding to Unintentional Contact with a Computing Device"; U.S. Pat. No. 7,437,406 to Haudoc et al., issued Oct. 14, 2008 and titled "System and method for providing language localization for server-based applications"; U.S. Pat. No. 6,993,568 to Haudoc et al., issued Jan. 31, 2006 and titled "System and method for providing language localization for server-based applications with scripts"; U.S. Pat. No. 8,789,015 to Lerum et al., issued Jul. 22, 2014 and titled "Integrated application localization"; U.S. Patent Publication Number 2008/0281804 to Zhao et al., published Nov. 13, 2008 and titled "Searching mixed language document sets"; U.S. Patent Publication Number 2008/0288239 to Bailey et al., published Nov. 20, 2008 and titled "Localization and internationalization of document resources"; U.S. Patent Publication Number 20130007598 to Draper et al., published Jan. 3, 2013 and titled "Techniques for applying cultural settings to documents during localization"; U.S. Patent Publication Number 2014/0006004 to Gundepuneni et al., published Jan. 2, 2014 and titled "Generating localized user interfaces"; and U.S. Pat. No. 9,942,333 to Ongg et al., issued Apr. 10, 2018 and titled "Cloud-based content localization", the disclosures of each of which are herein incorporated by reference in their entirety.

While various implementations have been described, the description is intended to be exemplary, rather than limiting, and it is understood that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A system for managing edits to localized versions of electronic content, the system comprising:
 a processor; and
 machine-readable media including instructions which, when executed by the processor, cause the processor to:
  determine that a first edit event has occurred during access of a first localized version of a first base electronic content, the first base electronic content comprising electronic content in a first language, and the first localized version of the first base electronic content comprising at least a portion of the first base electronic content translated to a second language, the first edit event including a first modification of a first portion of the first localized version by a first user;

generate a first score for the first edit event based on at least a first content characteristic of the first modification and a first user characteristic that describes a usage history of the first user;

determine that the first modification has a high likelihood of being substantive based on at least the first score using a model which predicts whether modifications are substantive;

initiate, in response to the determination that the first modification has the high likelihood of being substantive, an automated propagation of the first modification to at least the first base electronic content;

present a message to a document manager requesting confirmation that the first modification was indeed substantive; and reinforce the model using the confirmation from the document manager, wherein the model determines whether the modifications are substantive by comparing scores of edit events with a first threshold and a second threshold such that the edit events having a score that falls below the first threshold are non-substantive edits, the edit events having a score that exceeds the first threshold and falls below the second threshold are ambiguous edits and the message to the document manager is presented, and the edit events having a score that exceeds the first threshold and the second threshold are substantive edits which are propagated without requiring confirmation from the document manager.

2. The system of claim 1, wherein the first content characteristic describes a number of words added, changed, or deleted during the first edit event.

3. The system of claim 1, wherein the first user characteristic describes a previous modification history by the first user.

4. The system of claim 1, wherein the first user characteristic describes a previous professional experience by the first user related to a topic presented in the first base electronic content.

5. The system of claim 1, wherein the instructions further cause the processor to:

determine that a second edit event has occurred during access of the first localized version, the second edit event including a second modification of a second portion of the first localized version by the first user;

generate a second score for the second edit event based on at least a second content characteristic of the second modification;

determine that the second modification is an ambiguous edit based on at least the second score;

cause, in response to the determination that the second modification is an ambiguous edit, a first user interface element including a first option for tagging the second modification as substantive to be presented to the first user; and cause, in response to receiving a first user input from the first user indicating a selection of the first option, a first user message to be transmitted to the document manager for the first base electronic content.

6. The system of claim 5, wherein the first user message includes a second option for tagging the second modification as substantive, and the instructions further cause the processor to:

receive a second user input from the document manager indicating a selection of the second option; and initiate, in response to receiving the second user input, an automated propagation of the second modification to at least the first base electronic content.

7. The system of claim 5, wherein the second content characteristic describes an extent to which the second modification included changes associated with punctuation of the second portion.

8. The system of claim 1, wherein the instructions further cause the processor to:

determine that a second edit event has occurred during access of a second localized version of a second base electronic content, the second edit event including a second modification of a second portion of the second localized version by a second user;

generate a second score for the second edit event based on at least the first content characteristic of the second modification;

determine that the second modification is a substantive edit based on at least the second score; and cause, in response to the determination that the second modification is a substantive edit, a first user message to be transmitted to the document manager for the second base electronic content, the first user message including a notification of the occurrence of the second edit event.

9. The system of claim 1, wherein the automated propagation includes a translation of the first modification to a base language in which the base electronic content is presented and incorporating the translation of the first modification into the base electronic content.

10. A method for managing edits to localized versions of electronic content, the method comprising:

determining that a first edit event has occurred during access of a first localized version of a first base electronic content, the first base electronic content comprising electronic content in a first language, and the first localized version of the first base electronic content comprising at least a portion of the first base electronic content translated to a second language, the first edit event including a first modification of a first portion of the first localized version by a first user;

generating a first score for the first edit event based on at least a first content characteristic of the first modification and a first user characteristic that describes a usage history of the first user;

determining that the first modification has a high likelihood of being substantive based on at least the first score using a model which predicts whether modifications are substantive;

initiating, in response to the determination that the first modification has the high likelihood of being substantive, an automated propagation of the first modification to at least the first base electronic content;

presenting a message to a document manager requesting confirmation that the first modification was indeed substantive; and reinforcing the model using the confirmation from the document manager, wherein the model determines whether the modifications are substantive by comparing scores of edit events with a first threshold and a second threshold such that edit events having a score that falls below the first threshold are non-substantive edits, edit events having a score that exceeds the first threshold and falls below the second threshold are ambiguous edits and the message to the document manager is presented, and edit events having a score that exceeds the second threshold are substantive edits which are automatically propagated to the first base electronic content.

11. The method of claim 10, wherein the first content characteristic describes a number of words added, changed, or deleted during the first edit event.

12. The method of claim 10, wherein the first user characteristic describes a previous modification history by the first user.

13. The method of claim 10, wherein the first user characteristic describes a previous professional experience by the first user related to a topic presented in the first base electronic content.

14. The method of claim 10, further comprising:
determining that a second edit event has occurred during access of the first localized version, the second edit event including a second modification of a second portion of the first localized version by the first user;
generating a second score for the first edit event based on at least a second content characteristic of the second modification;
determining that the second modification is an ambiguous edit based on at least the second score;
causing, in response to the determination that the second modification is an ambiguous edit, a first user interface element including a first option for tagging the second modification as substantive to be presented to the first user; and
causing, in response to receiving a first user input from the first user indicating a selection of the first option, a first user message to be transmitted to the document manager for the first base electronic content.

15. The method of claim 14, wherein the first user message includes a second option for tagging the second modification as substantive, and the method further comprises:
receiving a second user input from the document manager indicating a selection of the second option; and
initiating, in response to receiving the second user input, an automated propagation of the second modification to at least the first base electronic content.

16. The method of claim 14, wherein the second content characteristic describes an extent to which the second modification included changes associated with punctuation of the second portion.

17. The method of claim 10, further comprising:
determining that a second edit event has occurred during access of the first localized version, the second edit event including a second modification of a second portion of the first localized version by the first user;
generating a second score for the first edit event based on at least a second content characteristic of the second modification;
determining that the second modification is an ambiguous edit based on at least the second score;
causing, in response to the determination that the second modification is an ambiguous edit, a first user message to be transmitted to the document manager for the first base electronic content, the first user message including a first option for tagging the second modification as substantive;
receiving a first user input from the document manager indicating a selection of the first option; and
initiating, in response to receiving the first user input, an automated propagation of the second modification to at least the first base electronic content.

18. The method of claim 10, further comprising:
determining that a second edit event has occurred during access of a second localized version of a second base electronic content, the second edit event including a second modification of a second portion of the second localized version by a second user;
generating a second score for the second edit event based on at least the first content characteristic of the second modification;
determining that the second modification is a substantive edit based on at least the second score; and
causing, in response to the determination that the second modification is a substantive edit, a first user message to be transmitted to the document manager for the second base electronic content, the first user message including a notification of the occurrence of the second edit event.

19. A machine-readable medium on which are stored instructions that, when executed, cause a processor of a programmable device to perform operations of:
determining that a first edit event has occurred during access of a first localized version of a first base electronic content, the first base electronic content comprising electronic content in a first language, and the first localized version of the first base electronic content comprising at least a portion of the first base electronic content translated to a second language, the first edit event including a first modification of a first portion of the first localized version by a first user;
generating a first score for the first edit event based on at least a first content characteristic of the first modification and a first user characteristic that describes a usage history of the first user;
determining that the first modification has a high likelihood of being substantive based on at least the first score using a model which predicts whether modifications are substantive;
initiating, in response to the determination that the first modification has the high likelihood of being substantive, an automated propagation of the first modification to at least the first base electronic content;
presenting a message to a document manager requesting confirmation that the first modification was indeed substantive; and
reinforcing the model using the confirmation from the document manager,
wherein the model determines whether the modifications are substantive by comparing scores of edit events with a first threshold and a second threshold such that edit events having a score is below the first threshold are non-substantive, edit events having a score that exceeds the first threshold and falls below the second threshold are ambiguous edits and the message to the document manager is presented, and edit events having a score that exceeds the second threshold are substantive edits which are propagated to the first base electronic content.

* * * * *